US007778742B2

(12) United States Patent
Kuge et al.

(10) Patent No.: US 7,778,742 B2
(45) Date of Patent: Aug. 17, 2010

(54) METHOD AND SYSTEM FOR INTENTION ESTIMATION AND OPERATION ASSISTANCE

(75) Inventors: Nobuyuki Kuge, Yokosuka (JP); Tomohiro Yamamura, Yokohama (JP); Dario Salvucci, Philadelphia, PA (US)

(73) Assignees: Nissan Motor Co., Ltd., Tokohama-shi, Kanagawa-ken (JP); Drexel University, Philadelphia, PA (US)

( * ) Notice: Subject to any disclaimer, the term of this patent is extended or adjusted under 35 U.S.C. 154(b) by 0 days.

(21) Appl. No.: 12/068,584

(22) Filed: Feb. 8, 2008

(65) Prior Publication Data
US 2008/0147249 A1    Jun. 19, 2008

Related U.S. Application Data

(62) Division of application No. 11/012,158, filed on Dec. 16, 2004, now Pat. No. 7,349,767.

(30) Foreign Application Priority Data
Dec. 16, 2003    (JP)    ............... P 2003-417744

(51) Int. Cl.
*G05D 1/00* (2006.01)
*G06F 7/00* (2006.01)
*G06F 17/00* (2006.01)

(52) U.S. Cl. .............. 701/1; 701/36; 701/41; 701/46; 701/70; 701/96; 701/301; 180/275; 180/280; 340/435; 340/436; 340/438; 340/439

(58) Field of Classification Search .......... 701/1, 701/36, 41, 46, 70, 96, 301; 180/275, 280; 340/435, 436, 438, 439
See application file for complete search history.

(56) References Cited

U.S. PATENT DOCUMENTS

| 5,189,621 A | 2/1993 | Onari et al. |
| 5,485,892 A | 1/1996 | Fujita |
| 5,521,579 A | 5/1996 | Bernhard |
| 5,546,305 A | 8/1996 | Kondo |

(Continued)

FOREIGN PATENT DOCUMENTS

DE    19620929 A1    11/1997

(Continued)

OTHER PUBLICATIONS

U.S. Appl. No. 11/012,208, filed Dec. 16, 2004, Kuge et al.

(Continued)

*Primary Examiner*—Jack Keith
*Assistant Examiner*—Chuong P Nguyen
(74) *Attorney, Agent, or Firm*—McDermott Will & Emery LLP

(57) ABSTRACT

An intention estimation and operation assistance system for estimating an operator's intention and providing assistance to operation of a machine. Reference data, such as the operation of a plurality of hypothetical operators, is provided for comparison with the operation of a real operator, to determine an estimated intention of the operator. The estimated operator is utilized to alter the operation of the machine, to provide a safer and/or smoother operation experience in operating the machine.

13 Claims, 17 Drawing Sheets

U.S. PATENT DOCUMENTS

| | | | |
|---|---|---|---|
| 5,776,031 | A | 7/1998 | Minowa et al. |
| 5,790,403 | A | 8/1998 | Nakayama |
| 5,906,560 | A | 5/1999 | Minowa et al. |
| 5,908,457 | A | 6/1999 | Higashira et al. |
| 5,911,771 | A | 6/1999 | Reichart et al. |
| 6,049,749 | A | 4/2000 | Kobayashi |
| 6,057,754 | A | 5/2000 | Kinoshita et al. |
| 6,092,005 | A | 7/2000 | Okada |
| 6,092,014 | A | 7/2000 | Okada |
| 6,092,619 | A | 7/2000 | Nishikawa et al. |
| 6,138,062 | A | 10/2000 | Usami |
| 6,178,365 | B1 | 1/2001 | Kawagoe et al. |
| 6,185,492 | B1 | 2/2001 | Kagawa et al. |
| 6,240,357 | B1 | 5/2001 | Bastian |
| 6,278,362 | B1 | 8/2001 | Yoshikawa et al. |
| 6,294,987 | B1 | 9/2001 | Matsuda et al. |
| 6,388,565 | B1 | 5/2002 | Bernhard et al. |
| 6,393,361 | B1 | 5/2002 | Yano et al. |
| 6,463,369 | B2 | 10/2002 | Sadano et al. |
| 6,489,887 | B2 | 12/2002 | Satoh et al. |
| 6,493,619 | B2 | 12/2002 | Kawazoe et al. |
| 6,675,094 | B2 | 1/2004 | Russell et al. |
| 2002/0013650 | A1 | 1/2002 | Kusafuka et al. |
| 2002/0128751 | A1 | 9/2002 | Engstrom et al. |
| 2003/0060936 | A1 | 3/2003 | Yamamura et al. |
| 2003/0233902 | A1 | 12/2003 | Hijikata |
| 2003/0236608 | A1 | 12/2003 | Egami |
| 2004/0172185 | A1 | 9/2004 | Yamamura et al. |
| 2005/0131589 | A1* | 6/2005 | Yamamura et al. ............ 701/1 |
| 2005/0131590 | A1* | 6/2005 | Kuge et al. .................... 701/1 |
| 2006/0145827 | A1* | 7/2006 | Kuge et al. ................ 340/439 |
| 2006/0178789 | A1* | 8/2006 | Kuge ............................ 701/1 |
| 2008/0033614 | A1* | 2/2008 | Schiehlen et al. ............ 701/41 |

FOREIGN PATENT DOCUMENTS

| | | |
|---|---|---|
| EP | 1197683 A2 | 4/2002 |
| EP | 1375280 A2 | 5/2002 |
| EP | 1285842 A2 | 8/2002 |
| EP | 1256479 A1 | 11/2002 |
| EP | 1426230 A2 | 11/2002 |
| EP | 1357013 A1 | 3/2003 |
| EP | 1 347 214 A2 | 9/2003 |
| FR | 2838386 | 10/2003 |
| JP | 2002-331850 | 11/2002 |

OTHER PUBLICATIONS

U.S. Appl. No. 11/012,165, filed Dec. 16, 2004, Yamamura et al.
U.S. Appl. No. 11/012,158, filed Dec. 16, 2004, Kuge et al.

* cited by examiner

Upon determination that the lane change continues :

terminate   Upon failure to determine that the lane change continues :

METHOD AND SYSTEM FOR INTENTION ESTIMATION AND OPERATION ASSISTANCE

RELATED APPLICATIONS

The present application is a Divisional of U.S. application Ser. No. 11/012,158, filed Dec. 16, 2004, which has issued as U.S. Pat. No. 7,349,767, claiming the benefit of priority from Japanese patent application No. 2003-417744, filed Dec. 16, 2003, all the disclosure of each of which are incorporated herein by reference.

FIELD OF THE DISCLOSURE

This application generally relates to system and method for estimating an operator's intention and providing operation assistance, and more particularly, to a driver's intention estimation and driving assistance system.

BACKGROUND OF DISCLOSURE

A number of methods and systems have been proposed for providing assistance in operating a device, system or machine, such as an automobile. For example, several driving assistance systems were disclosed in U.S. Published Patent Application No. 20030060936 A1, published Mar. 27, 2003 and U.S. Published Patent Application No. 20040172185 A1, published Sep. 2, 2004. In order to enhance performance, some driver assisting systems may require estimation of a driver's intention in driving a vehicle. A system for estimating a driver's intention may collect estimates of the driver's intention using movement of the driver's eyes. For example, directions to which the driver's eyes turn are projected onto a plane divided into a number of regions, for calculating a distribution of projected eye directions over the divided regions to estimate the driver's intention. However, such type of systems lacks accuracy in estimating the driver's intention because the driver's eyes move all the time and are not always related to a "driving" intention of the driver.

Therefore, there is a need for reliable driver's intention estimation systems that can estimate the driver's intention with satisfactory accuracy.

SUMMARY OF DISCLOSURE

This disclosure presents system, control process and method that provide effective estimation of an operator's intention in operating a device, system or machine. The advantages, operations and detailed structures of the disclosed methods and systems will be appreciated and understood from the descriptions provided herein.

An exemplary system and method according to this disclosure estimate an operator's intention by utilizing data related to a plurality of reference operators, such as hypothetical or imaginary operators. Each of the imaginary operators has a behavior pattern, such as an associated operation like changing lanes to the right, changing lanes to the left or maintaining current lane, and corresponding intention like a lane-change intention to the right (LCR), a lane-changing intention to the left (LCL) or a lane-keeping intention. A determination is made to identify an imaginary operator that has the closest behavior pattern to the real operator. An estimated intention of the real operator is generated based on information or attributes related to the identified imaginary operator, such as the associated intention of the identified imaginary operator.

An exemplary system of this disclosure may be used to estimate an intention of a driver of a vehicle. The exemplary system includes a first device configured to detect an operation of a real driver of a vehicle, and a second device configured to calculate a respective likelihood value for each of a plurality of imaginary drivers based on the operation of the real driver and an operation of each of the plurality of imaginary drivers. The respective operation of each of the plurality of imaginary drivers is associated with an intention. The system further includes a third device configured to determine an estimated intention of the real driver based on the respective likelihood value of each of the plurality of imaginary drivers. The first, second and third devices may be implemented using microcontrollers and associated control codes and/or software.

In one embodiment, one of the imaginary drivers is selected based on the respective likelihood values of the drivers. The estimated intention of the driver is determined based on the intention of the selected one of the plurality of imaginary drivers. According to another embodiment, an operation of the real driver at each one of different points in time is detected. The respective likelihood value for each of the plurality of imaginary drivers is generated based on partial likelihood values of each of the plurality of imaginary drivers at the different points in time. Each of the partial likelihood values is respectively associated with a respective operation of one of the plurality of imaginary drivers at each one of the different points in time, and is generated based on the respective detected operation of the real driver at each one of the different points in time and the respective operation of one of the plurality of imaginary drivers at each one of the different points in time. In one example, each respective likelihood value for each of the plurality of imaginary drivers is a respective summation of partial likelihood values of each of the plurality of imaginary drivers at the different points in time.

In another embodiment, data related to at least one additional imaginary driver at a selected point in time is generated based on the intention of a first one of the plurality of imaginary drivers at a point of time preceding the selected point of time, wherein each of the at least one additional imaginary driver has an associated intention and operation at each respective one of the different points in time. In one aspect, the intention of each of the at least one additional imaginary driver at the selected point of time is different from the intention of the first one of the plurality of imaginary drivers at the selected point of time. In another aspect, each additional imaginary driver assumes the associated intention of the first one of the plurality of imaginary drivers at each point in time preceding the selected point in time. In still another aspect, for each of the imaginary drivers, an intention corresponding to a new point in time is generated based on the respective intention of each of the imaginary drivers at a point in time preceding the new point in time. In yet another aspect, a selected one of the imaginary drivers is eliminated based on an intention of the selected one of the plurality of imaginary drivers at a specific point in time and an operation status of the vehicle.

Another exemplary system according to this disclosure utilizes the estimated intention to control the operation of a machine, such as a vehicle. A risk potential related to the vehicle is calculated using various known approaches, such as by detecting distances between the vehicle and other vehicles, the speed of the vehicle, etc. The system includes a device for providing a signal, such as a haptic signal, to the operator or driver to indicate the status of the risk potential associated with the operation or the vehicle. For example, a resistant force or a reaction force that a driver experiences when operating a device to control the vehicle, such as an accelerator pedal, is varied or regulated based on the calculated risk potential. In another example, a response of the steering wheel or a reaction force to be experienced by a driver when turning the steering wheel is varied or adjusted based on the calculated risk potential. According to one embodiment, the risk potential is adjusted based on the estimated intention of the operator or driver, such that a more suitable haptic signal can be generated considering the intention of the operator. According to another example, the haptic signal is generated based on the calculated risk potential and the estimated intention of the real driver.

Additional advantages of the present disclosure will become readily apparent to those skilled in this art from the following detailed description, wherein only the illustrative embodiments are shown and described, simply by way of illustration of the best mode contemplated. As will be realized, the disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which:

FIG. 10($b$) is an illustration of a second rule applied during generation of imaginary drivers as illustrated in FIG. 9.

FIG. 17($b$) illustrates varying of a corrected accelerator pedal reaction force instruction value FAc in response to the estimated driver's lane-change intention.

ILLUSTRATIVE EMBODIMENTS OF THE DISCLOSURE

First Exemplary Implementation

In the following description, for the purposes of explanation, numerous specific details are set forth in order to provide a thorough understanding of the present disclosure. It will be apparent, however, to one skilled in the art that the Present method and system may be practiced without these specific details. In other instances, well-known structures and devices are shown in block diagram form in order to avoid unnecessarily obscuring the present disclosure. For illustration purpose, the following examples describe the operation of an exemplary tester used for evaluating a circuit of an automotive vehicle. It is understood that the use of tester is not limited to vehicle circuits. The tester also can be used in other types of electrical circuits.

Figure 1:
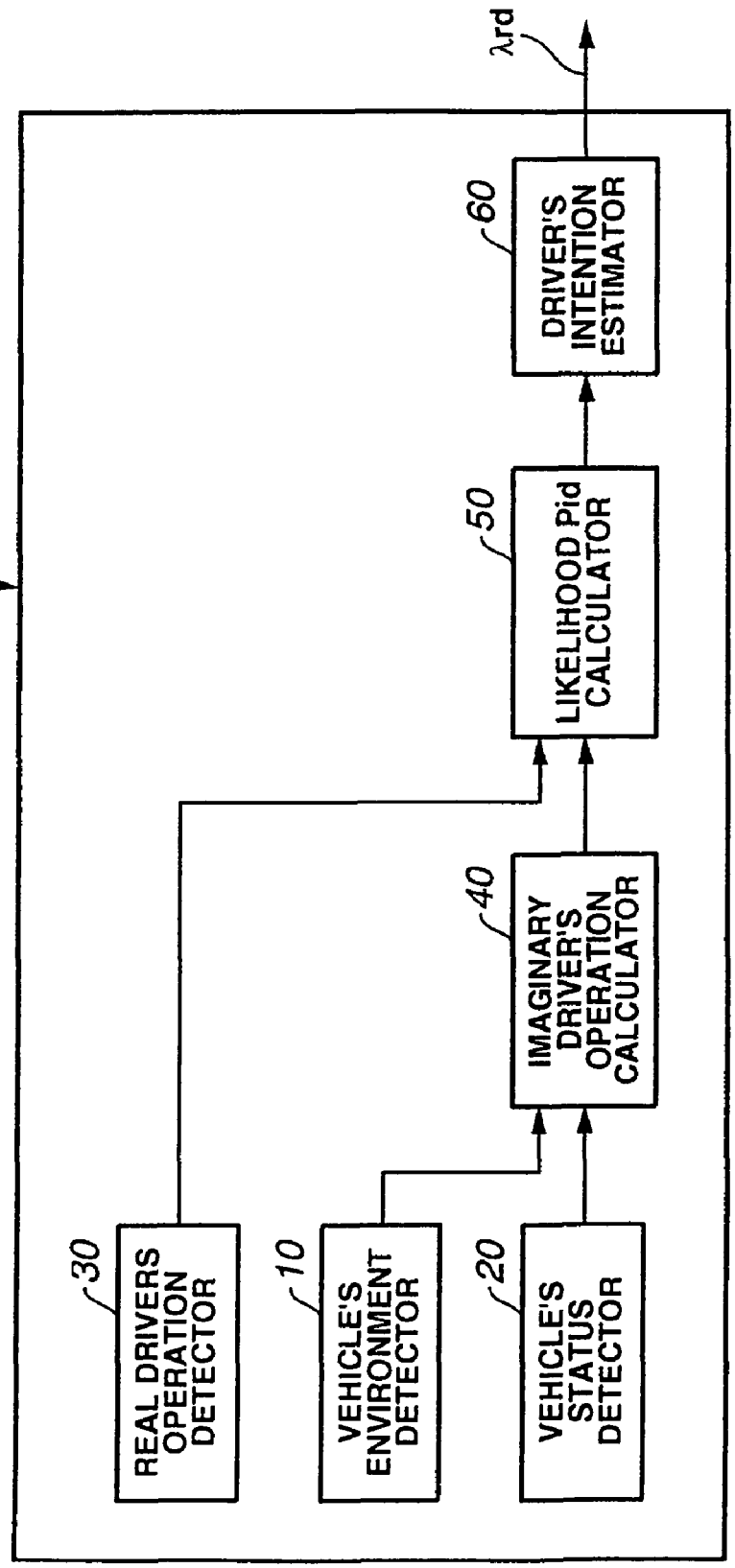
FIG. 1 is a block diagram illustrating an exemplary implementation of a driver's intention estimating system according to the present disclosure.

Referring to FIG. 1, a driver's intention estimating system 1 for a vehicle includes a vehicle's environment detector 10, a vehicle's status detector 20, a real driver's operation detector 30, an imaginary driver's operation calculator 40, a likelihood value calculator 50, and a driver's intention estimator 60. The vehicle's environment detector 10 detects state of environment within a field around the vehicle. The vehicle's status detector 20 detects status of the vehicle. The real driver's operation detector 30 detects an operation of a real driver in driving the vehicle.

The driver's intention estimating system 1 has access to reference data, such as data related to a plurality of imaginary drivers. Each of the plurality of imaginary drivers has an associated intention and a corresponding operation to operate the vehicle according to the respective intention. The associated intention may be a lane-change intention to the right (LCR), a lane-changing intention to the left (LCL) or a lane-keeping intention, and the corresponding operation may be changing lanes to the right, changing lanes to the left or maintaining current lane. Detailed operations of the associated intentions and operations will be discussed in below shortly. The driver's intention estimating system 1 evaluates how close the detected operation of the real driver to each of the plurality of imaginary drivers. For instance, system 1 calculates a likelihood value for each of the imaginary drivers by comparing the detected operation of the real driver to an associated operation of each imaginary driver. The driver's intention estimating system 1 estimates the intention of the real driver based on the determined likelihood values.

In the exemplary implementation, the vehicle's environment detector 10 includes a front camera that covers a field of front view and a yaw angle sensor. The front camera acquires image on road conditions, for example, within the field of front view. The vehicle's environment detector 10 detects a lateral distance y of the vehicle from a centerline within a lane, and a yaw angle ψ of the vehicle with respect a line parallel to the centerline. The vehicle's environment detector 10 is equipped with an image processor that processes the acquired image.

In the exemplary implementation, the vehicle's status detector 20 includes a vehicle speed sensor that detects a speed of the vehicle. The real driver's operation detector 30 includes a steering angle sensor that is provided in a steering system to detect a steering angle of the vehicle.

In the exemplary implementation, the imaginary driver's operation calculator 40, likelihood value calculator 50, and driver's intention estimator 60 are implemented using one or more microcomputers or microcontrollers executing microcode, software programs and/or instructions. The microcode and/or software reside in volatile and/or non-volatile data storage devices and/or machine-readable data storage medium such as read only memory (ROM) devices, random access memory (RAM) devices, SRAM, PROM, EPROM, CD-ROM, disks, carrier waves, etc.

The imaginary driver's operation calculator 40 calculates operation of each imaginary driver in driving the vehicle as directed by an intention associated with each imaginary driver. The likelihood value calculator 50 calculates a likelihood value based on the calculated operation of each imaginary driver and the detected operation of the real driver. The driver's intention estimator 60 estimates an intention of the real driver by comparing the calculated likelihood values with each other.

Figure 2:
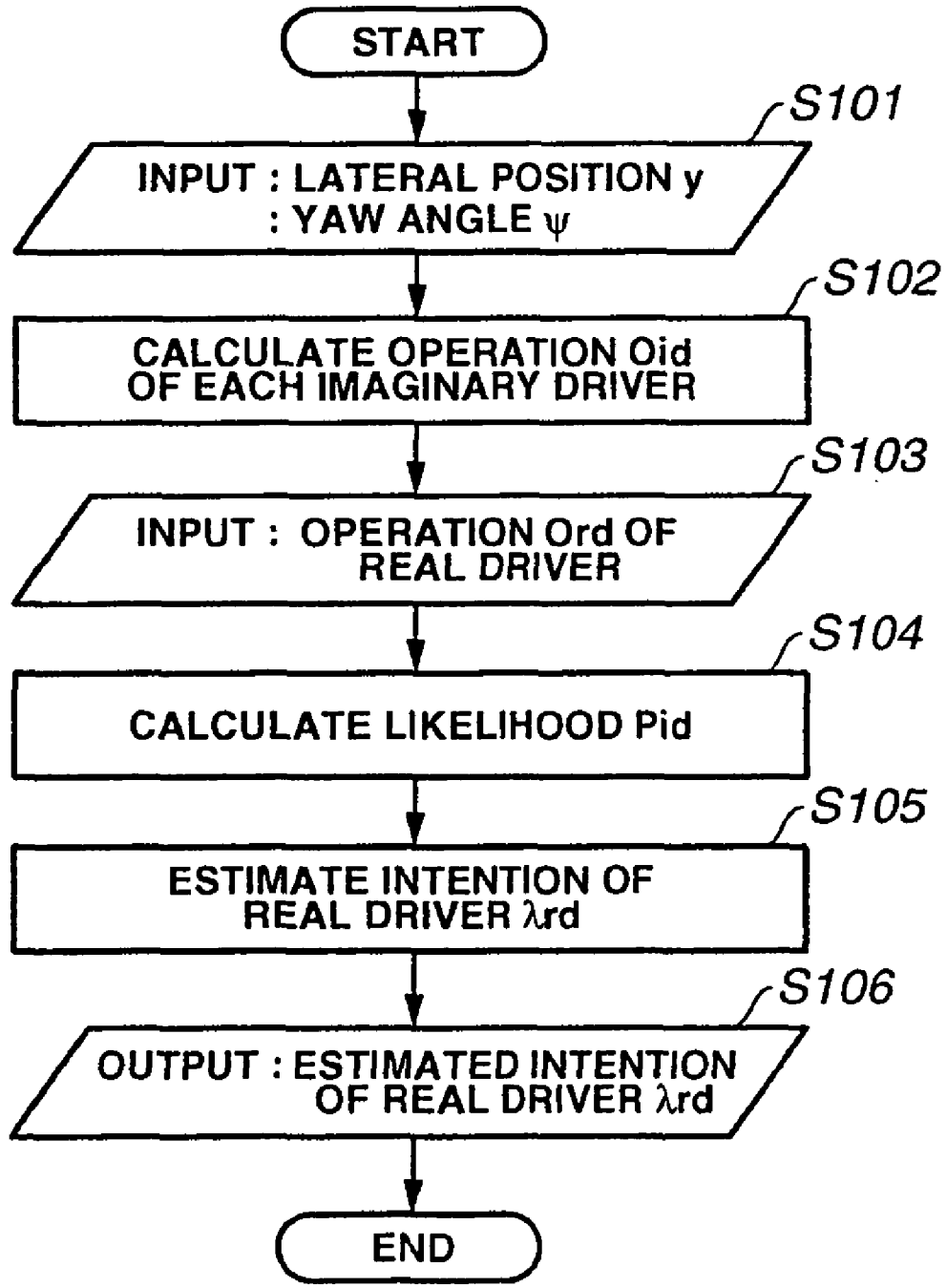
FIG. 2 is a flow chart illustrating the operation of the driver's intention estimating system illustrated in FIG. 1.
Figure 3:
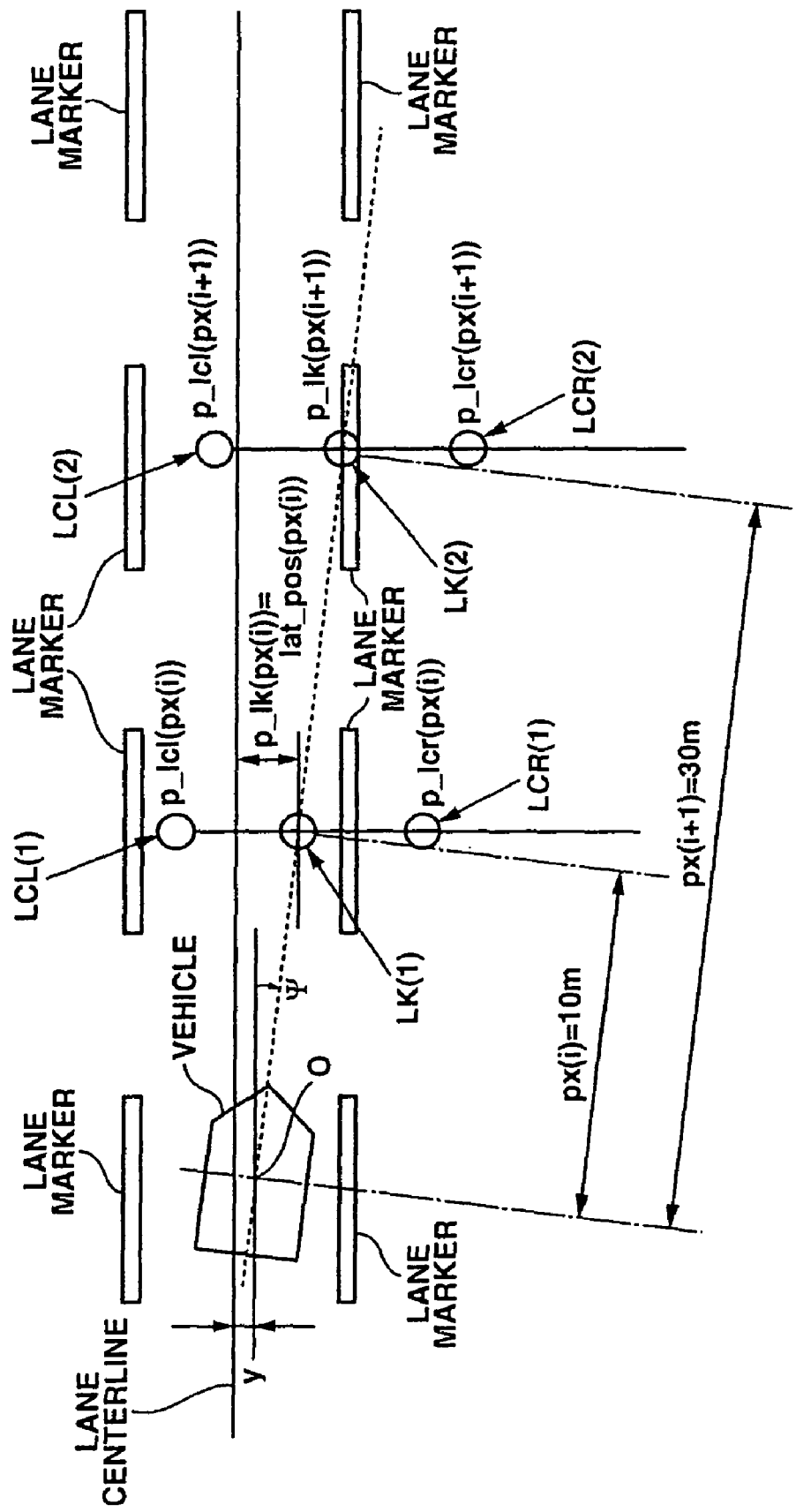
FIG. 3 illustrates an example to calculate operation of each imaginary driver in driving the vehicle as directed by a given intention.

Referring to FIGS. 2 and 3, the operation of the driver's intention estimating system 1 is explained. The flow chart in FIG. 2 illustrates a driver's intention estimation processing program. Execution of this program is repeated at a regular interval of, for example, 50 milliseconds.

At step S101, the microcomputer reads in, as inputs, a lateral position y of the vehicle within a lane (or track) and a yaw angle ψ of the vehicle. As shown in FIG. 3, the lateral position y is a distance of a center O of the vehicle from the centerline of the lane, and the yaw angle ψ is an angle through which the vehicle is turned relative to the centerline of the lane.

At step S102, the microcomputer calculates operation Oid of each of a plurality of imaginary drivers. In this example, three imaginary drivers are utilized, including an imaginary driver A having a lane-keeping intention (LK), an imaginary driver B having a lane-change intention to the right (LCR), and an imaginary driver C having a lane-change intention to the left (LCL). The microcomputer calculates operation Oid of each of these three imaginary drivers A, B and C in driving the vehicle as directed by the given intention. More particularly, the microcomputer calculates, as the operation Oid, a steering angle θid, by which each of the three imaginary drivers A, B and C manipulates a steering wheel in driving the vehicle as directed by the given intention. The following description discusses how the operation Oid is calculated.

(1) Imaginary Driver A having a Lane-Keeping Intention (LK):

To calculate a steering angle θid_lk, by which the imaginary driver A manipulates a steering wheel in driving the vehicle as directed by the lane-keeping intention (LK), the microcomputer sets at least one reference point LK(i) in front on a longitudinal centerline of the vehicle at a distance px(i) from the center O of the vehicle, and calculates a lateral position p_lk(px(i)) of the reference point LK(i) from a centerline of a lane. At least one reference point LK(i) includes any desired number of reference points LK(i). In this example, as shown in FIG. 3, two reference points LK(1) and LK(2) are set on the longitudinal centerline of the vehicle at different distances px(1) and px(2) from the center O of the vehicle. The setting was made that the distance px(1)=10 m and the distance px(2)=30 m. The distance px(i) may have varying values with different vehicle speeds.

A lateral distance lat_pos(px(i)) of the reference point LK(i) from the centerline of the lane is dependent on, and thus determined by, the yaw angle ψ and the distance px(i), which may be, for example, given by processing the acquired image from the front camera. Thus, the lateral position p_lk(px(i) of the reference point LK(i) may be expressed as:

$$p\_lk(px(i)=lat\_pos(px(i))\ i=\{1,\ldots,n\}$$ (Eq. 1)

The number n is equal to 2 (n=2) in the example shown in FIG. 3.

Using the lateral position p_lk(px(i)), the steering angle θid_lk may be expressed as:

$$\theta id\_lk = \Sigma\{a(i) \cdot p\_lk(px(i))\}$$ (Eq. 2)

where: a(i) is an appropriately determined coefficient weighting the lateral position p_lk(px(i)) and is determined based on characteristics of vehicles, such as the gear ratio of a vehicle implementing the system disclosed herein.

(2) 1 Imaginary Driver B having a Lane-Change Intention to the Right (LCR):

To calculate a steering angle θid_lcr, by which the imaginary driver B manipulates a steering wheel in driving the vehicle as directed by the lane-change intention to the right (LCR), the microcomputer sets at least one reference point LCR(i). At least one reference point LCR(i) includes any desired number of reference points LCR(i). In this example, as shown in FIG. 3, two reference points LCR(1) and LCR(2) are set.

A lateral position p_lcr(px(i)) of the reference point LCR (i) may be given as a sum of lat_pos(px(i)) and a predetermined offset lc_offset_lcr, and thus expressed as:

$$p\_lcr(px(i)=lat\_pos(px(i))+lc\_\text{offset}\_lcr\ i=\{1,\ldots,n\}$$ (Eq. 3)

The number n is equal to 2 (n=2) in the example shown in FIG. 3. The predetermined offset lc_offset_lcr is an appropriately determined value for giving the lateral position p_lcr(px(i)) of the reference point LCR(i). In this example, the offset lc_offset_lcr is equal to −1.75 (lc_offset_lcr=−1.75).

Using the lateral position p_lcr(px(i)), the steering angle θid_lcr may be expressed as:

$$\theta id\_lcr = \Sigma\{a(i) \cdot p\_lcr(px(i))\}$$ (Eq. 4)

where: a(i) is an appropriately determined coefficient weighting the lateral position p_lcr(px(i)) and is determined based on characteristics of vehicles, such as the gear ratio of a vehicle implementing the system disclosed herein.

(3) Imaginary Driver C having Lane-Change Intention to the Left (LCL):

To calculate a steering angle θid_lcl, by which the imaginary driver C manipulates a steering wheel in driving the vehicle as directed by the lane-change intention to the left (LCR), the microcomputer sets at least one reference point LCL(i). At least one reference point LCL(i) includes any desired number of reference points LCL(i). In this example, as shown in FIG. 3, two reference points LCL(1) and LCL(2) are set.

A lateral position p_lcl(px(i)) of the reference point LCL(i) may be given by a sum of lat_pos(px(i)) and a predetermined offset. lc_offset.lcl, and thus expressed as:

$$p\_lcl(px(i))=lat\_pos(px(i))+lc\_offset\_lcl\ i=\{1,\ldots,n\} \quad \text{(Eq. 5)}$$

The number n is equal to 2 (n=2) in the example shown in FIG. 3. The predetermined offset lc_offset_lcl is an appropriately determined value for giving the lateral position p_lcl(px(i)) of the reference point LCL(i). In this example, the offset lc_offset.lcl is equal to 1.75 (lc_offset_lcr=1.75).

Using the lateral position p_lcl(px(i)), the steering angle θid_lcl may be expressed as:

$$\theta id\_lcl=\Sigma\{a(i)\cdot p\_lcl(px(i))\} \quad \text{(Eq. 6)}$$

where: a(i) is an appropriately determined coefficient weighting the lateral position p_lcl(px(i)) and is determined based on characteristics of vehicles, such as the gear ratio of a vehicle implementing the system disclosed herein.

After calculating the operation Oid of each of the imaginary drivers A, B and C at step S102, the logic goes to step S103. At step S103, the microcomputer receives, as an input, an operation Ord of a real driver by reading in a current steering angle θrd detected by the real driver operation detector 30. In this exemplary implementation, the real driver's operation Ord is the detected real driver's steering angle θrd.

At the next step S104, using the calculated operation Oid of each imaginary driver and the detected operation Ord of the real driver, the microcomputer calculates a likelihood value Pid based on the calculated operation Oid of each imaginary driver and the detected operation Ord of the real driver. The likelihood value Pid is used to mean any one of a likelihood value Pid_lk of the imaginary driver A, a likelihood value Pid_lcr of the imaginary driver B, and a likelihood value Pid_lcl of the imaginary driver C. In the exemplary implementation, the calculated operation Oid of each imaginary driver is expressed by any one of the calculated steering angles θid_lk, θid_lcr, and θid_lcl. An imaginary driver's steering angle θid is used to mean any one of these calculated steering angles θid_lk, θid_lcr, and θid_lcl. In the exemplary implementation, the detected operation Ord of the real driver is expressed by the detected real driver's steering angle θrd.

The likelihood value Pid of each imaginary driver is a logarithmic probability of a normalized value of the imaginary driver's steering angle θid against a normal distribution, where the mean (e) is the real driver's steering angle θrd and the variance (σ) is a predetermined value ρrd such as a standard deviation of steering angles. Generally, the value of ρrd depends on characteristics of the vehicle, such as the steering gear ratio, and/or the speed of the vehicle. ρrd may range from −15 degrees to +15 degrees, such as between 3 to 5 degrees. Of course, other values of ρrd may be used depending on the type and/or characteristics of vehicles.

The likelihood value Pid is expressed as:

$$Pid=\log\{Probn[(\theta id-\theta rd)/\rho rd]\} \quad \text{(Eq. 7)}$$

where Probn is a probability density function that is used to calculate a probability with which a given sample is observed from a population expressed by the normal distribution.

At step S104, using the above equation, the microcomputer calculates a likelihood value Pid_lk of lane-keeping (LK), a likelihood value Pid_lcr of lane change to the right (LCR), and a likelihood value Pid_lcl of lane change to the left (LCL). Then, the logic goes to step S105.

At step S105, the microcomputer estimates an intention λrd of the real driver. In the exemplary implementation, the microcomputer chooses that one of the imaginary driver's intentions that has the maximum value among the calculated likelihood values, Pid_lk, Pid_lcr and Pid_lcl, as the intention λrd of the real driver. The real driver's intention λrd may be expressed as:

$$\lambda rd=\max\{Pid\_lk, Pid\_lcr, Pid\_lcl\} \quad \text{(Eq. 8)}$$

At the next step S106, the microcomputer provides, as an output, the estimated real driver's intention λrd.

The exemplary implementation described above provides effects as follows:

(1) With reference to FIG. 1, the functional block 40 labeled "imaginary driver's operation calculator" calculates a present operation Oid of each of a plurality of imaginary drivers in driving the vehicle as directed by an intention given to the imaginary driver within the environment around the vehicle. In this exemplary implementation, the imaginary drivers have different intentions, respectively, and each of them continues to retain a single unchanged intention over time. The functional block 50 labeled "likelihood value Pid calculator" calculates a likelihood value Pid of each of the calculated present operations Oid of the imaginary drivers with respect to the detected present operation Ord of the real driver. The functional block 60 labeled "driver's intention estimator" estimates an intention λrd of the real driver based on the calculated likelihood value Pid for each of the imaginary drivers. Using the likelihood value Pid of each of the calculated present operations Oid of the imaginary drivers with respect to the real driver's present operation Ord provides increased degree of precision in estimating the real driver's intention λrd.

(2) In estimating the real driver's intention, the functional block 60 labeled "driver's intention estimator" chooses that one of the imaginary driver's intentions that has gained the maximum value among the calculated likelihood values Pid as the real driver's intention λrd, which increases the accuracy in estimating the real driver's intention λrd.

(3) The setting that the imaginary drivers continues to retain unchanged lane-keeping intention (LK), lane-change intention to the right (LCR) and lane-change intention to the left (LCL) over time makes it possible to judge whether the real driver's intention λrd is a lane-keeping intention (LK) or a lane-change intention to the right (LCR) or a lane-change intention to the left (LCL).

Second Exemplary Implementation

Figure 4:
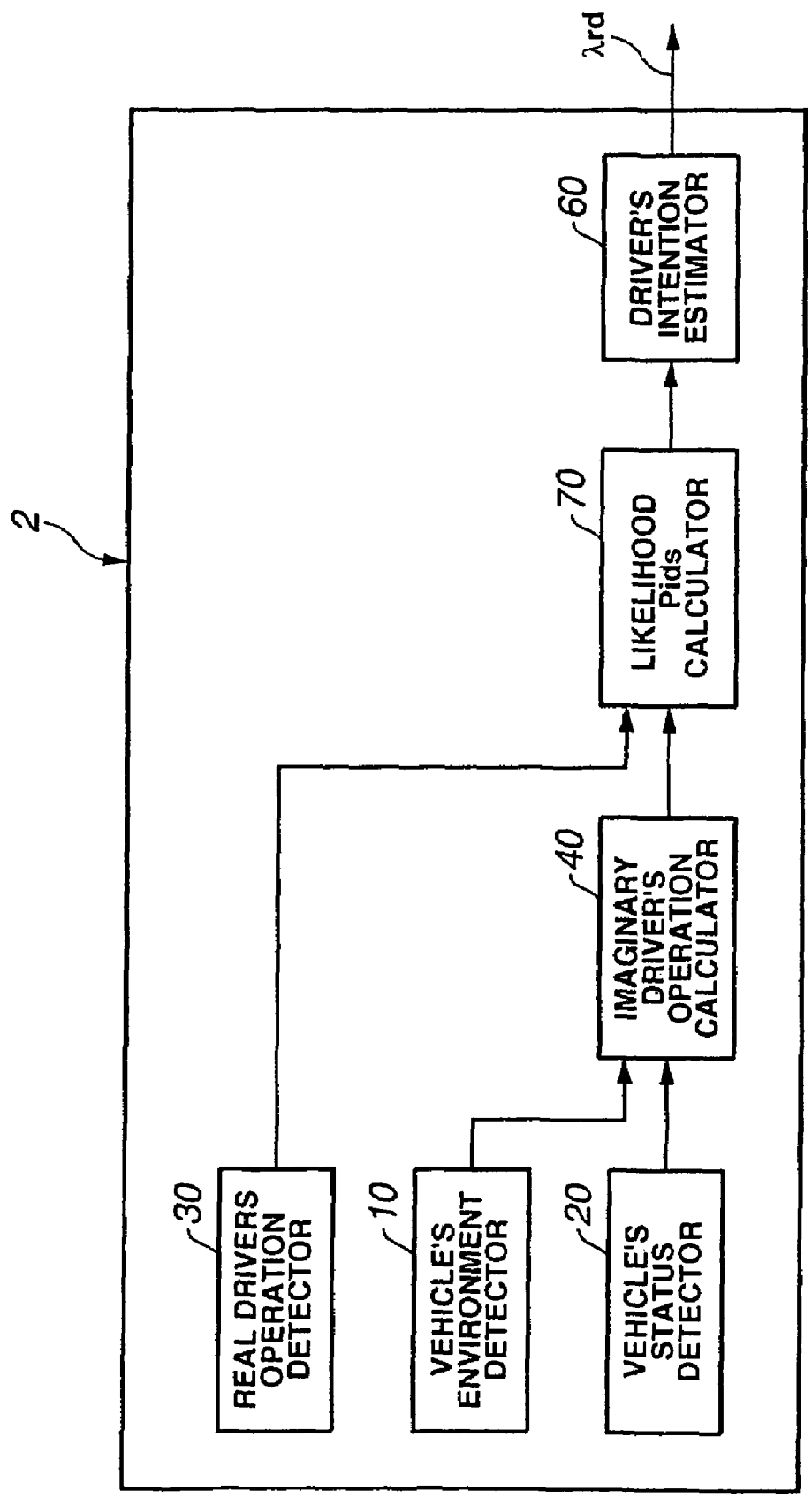
FIG. 4 is a block diagram illustrating another exemplary implementation of a driver's intention estimating system according to the present disclosure.
Figure 5:
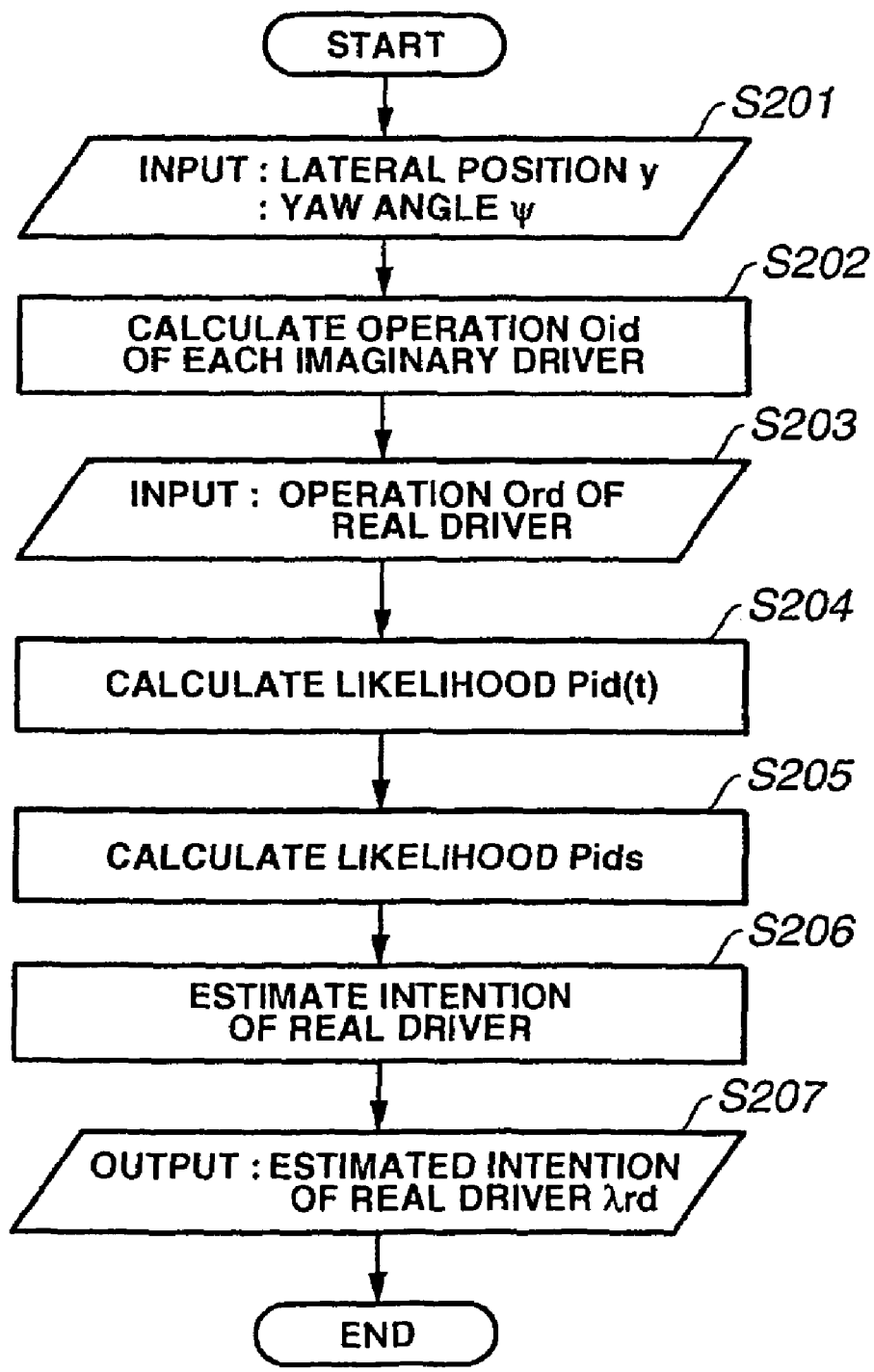
FIG. 5 is a flow chart illustrating the operation of the driver's intention estimating system illustrated in FIG. 4.
Figure 6:
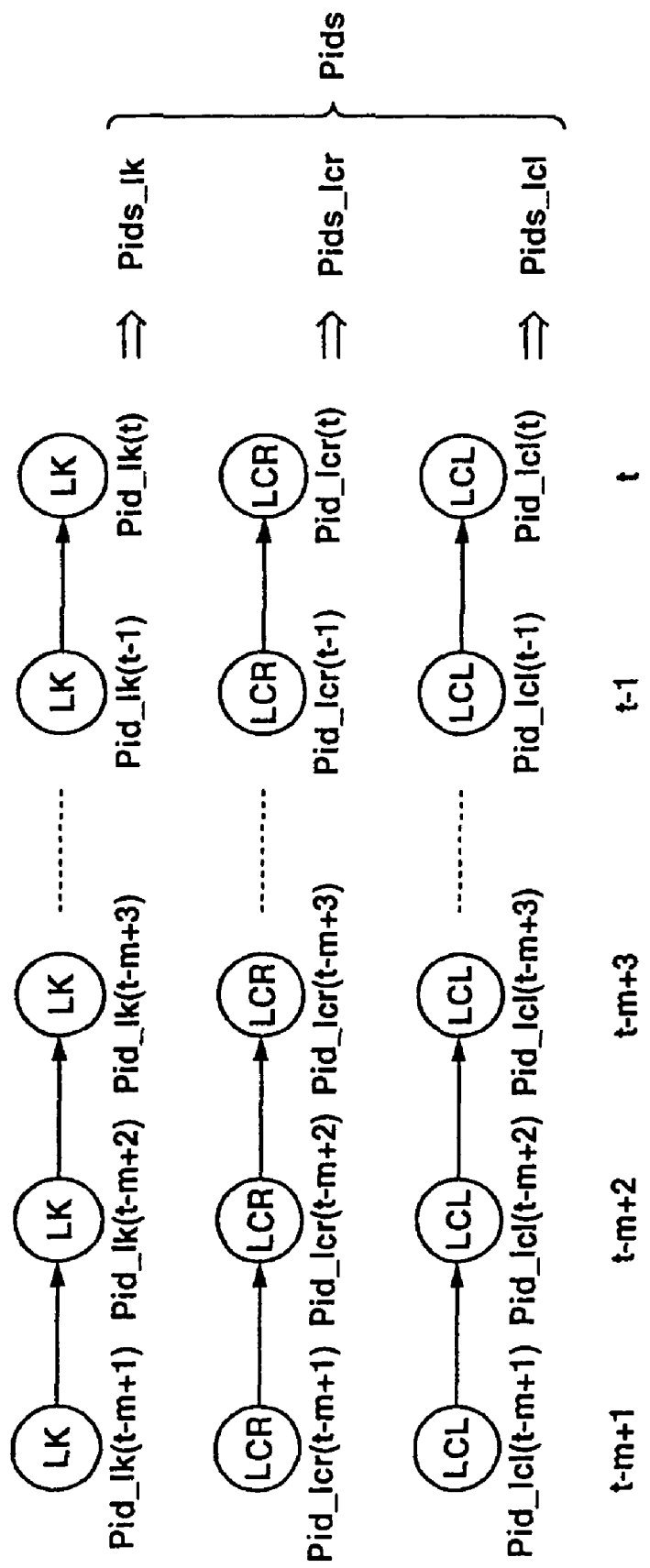
FIG. 6 is an exemplary illustration of memory spaces that include locations for storing likelihood values associated with different points in time for imaginary drivers.

Referring to FIGS. 4 to 6, another exemplary implementation of the present disclosure is described. In FIG. 4, the reference numeral 2 designates a driver's intention estimating system. This system 2 is substantially the same as the above described system 1. Like reference numerals are used to designate like elements throughout FIGS. 1 and 4. The system 2 is different from the system 1 in that, instead of calculating a likelihood value Pid for each of imaginary drivers based on the present data, a likelihood value Pids for each of the imaginary drivers is calculated based on a series of present and past data obtained within a predetermined period of time for use in estimating a real driver's intention λrd. Thus, the system 2 is provided with a functional block 70 labeled "likelihood values Pids calculator" instead of the functional block 50 labeled "likelihood value Pid calculator" illustrated in FIG. 1.

The driver's intention estimating system 2 includes likelihood value Pids calculator 70. The likelihood values Pids calculator 70 may be implemented using one or more microcomputers or microcontrollers executing microcode, software programs and/or instructions. Similarly to an imaginary driver's operation calculator 40 and a driver's intention estimator 60, the likelihood value Pids calculator 70 may be implemented using software or instructions to be executed by a central processor unit (CPU)

Referring to FIGS. 5 and 6, the operation of the driver's intention estimating system 2 is explained. The flow chart in FIG. 5 illustrates a driver's intention estimation processing program. Execution of this program is repeated at a regular interval of, for example, 50 milliseconds.

The flow chart illustrated in FIG. 5 has steps S201, S202, S203 and S204, which correspond to the steps S101, S102, S103 and S104 of the flow chart illustrated in FIG. 2. Thus, the microcomputer performs substantially the same jobs down to step S204 where the microcomputer calculates instantaneous likelihood values Pid, which generally denote a likelihood value Pid_lk of lane-keeping (LK), a likelihood value Pid_lcr of lane change to the right (LCR), and a likelihood value Pid_lcl of lane change to the left (LCL). Different from the flow chart in FIG. 2, the calculated likelihood values Pid are not used immediately for arithmetic operation in estimating an intention λrd of a real driver, but they are stored as Pid(t) in one or more memory portions, each being capable of retaining a series of m, in number, stored data.

Referring also to FIG. 6, in this exemplary implementation, three memory portions, namely, first, second and third memory portions, are provided for the lane-keeping intention (LK), lane-change intention to the right (LCR) and lane-change intention to the left (LCL) possessed by three imaginary drivers A, B and C, respectively. The first memory portion for the lane-keeping intention (LK) possessed by the imaginary driver A stores a LK series of m, in number, current and past likelihood values for a present point in time indicated by (t) back to a past point in time indicated by (t−m+1). The LK series of m likelihood values are stored at locations indicated at Pid. lk(t), Pid_lk(t−1) . . . , and Pid_lk(t−m+1). The second memory portion for the lane-change intention to the right (LCR) possessed by the imaginary driver B stores a LCR series of m current and past likelihood values ranging from a present point in time indicated by (t) back to a past point in time indicated by (t−m+1). The LCR series of m likelihood values are stored at locations indicated at Pid_lcr(t), Pid_lcr (t−1) . . . , and Pid_lcr(t−m+1). The third memory portion for the lane-change intention to the left (LCL) possessed by the imaginary driver C stores a LCL series of m, in number, likelihood values for present and past points in time ranging from the present moment indicated by (t) back to a past point in time indicated by (t−m+1). The LCL series of m likelihood values are stored at locations indicated at Pid_lcl(t), Pid_lcl (t−1) . . . , and Pid_lcl(t−m+1). For the purpose of illustration, Pid(t−i+1), where i=1, 2, 3 . . . m, is used to generally denote the LK series of Pid_lk(t)~Pid_lk(t−m+1), LCR series of Pid_lcr(t)~Pid_lcr(t−m+1) and LCL series of Pid_lcl(t)~Pid_lcl(t−m+1).

At step S205, the microcomputer calculates a collective likelihood value Pids, which may be expressed as:

$$Pids = \prod_{i=1}^{m} Pid(t-i+1) \quad \text{(Eq. 9)}$$

The equation Eq. 9 states that the collective likelihood value Pids is the product of the respective likelihood values of the series Pid(t)~Pid(t−m+1).

In this exemplary implementation, using the equation Eq. 9, the microcomputer calculates a LK collective likelihood value Pids_lk of the LK series, a LCR collective likelihood value Pids_lcr of the LCR series, and a LCL collective likelihood value Pids_lcl of the LCL series. After calculating the LK, LCR and LCL collective likelihood values Pids_lk, Pids_lcr and Pids_lcl at step S205, the logic goes to step S206.

At step S206, the microcomputer estimates an intention λrd of the real driver. In this exemplary implementation, the microcomputer chooses that one of the imaginary driver's intentions which has gained the maximum value among the calculated LK, LCR and LCL collective likelihood values Pids_l, Pids_lcr and Pids_lcl for the intention λrd of the real driver. The real driver's intention λrd may be expressed as:

$$\lambda rd = \max\{Pids\_lk, Pids\_lcr, Pids\_lcl\} \quad \text{(Eq. 10)}$$

At the next step S207, the microcomputer provides, as an output, the estimated real driver's intention λrd.

This exemplary implementation provides effects as follows:

(1) With reference to FIG. 4, the functional block 70 labeled "likelihood value Pids calculator" calculates a collective likelihood value Pids of a series of the calculated present and past operations Oid of each of the imaginary drivers, within a period of time ranging backwards from the present point in time (t), with respect to a series of the detected present and past operations Ord of the real driver within the same period of time. The functional block 60 labeled "driver's intention estimator" estimates an intention λrd of the real driver based on the collective likelihood value Pids for each of the imaginary drivers. Using the collective likelihood value Pids derived from the calculated present and past operations Oid of each of the imaginary drivers and the detected present and past operations Ord of the real driver within the same period of time provides better accuracy in estimating the real driver's intention λrd.

(2) The functional block 70 determines the collective likelihood value Pids for each of the imaginary drivers by calculating the product of all of present and past likelihood values Pid within the period of time ranging backwards from the present moment (t). The likelihood value Pids derived from the data collected within the period of time provides a more reliable tool in calculating a likelihood value of each of the imaginary driver with respect to the real driver.

Third Exemplary Implementation

In the previous description of the driver's intention estimating systems 1 and 2, the characteristics of the imaginary drivers A, B and C are not dynamic because the characteristics are unchanged over time. In other words, each of the imaginary drivers is designed to behave as directed by an intention unchanged over time.

In the following description, a dynamic family of imaginary drivers is provided. The number and characteristics of the family members are dynamic over time and some of them are designed to behave as directed by an intention changing over time.

Figure 7:
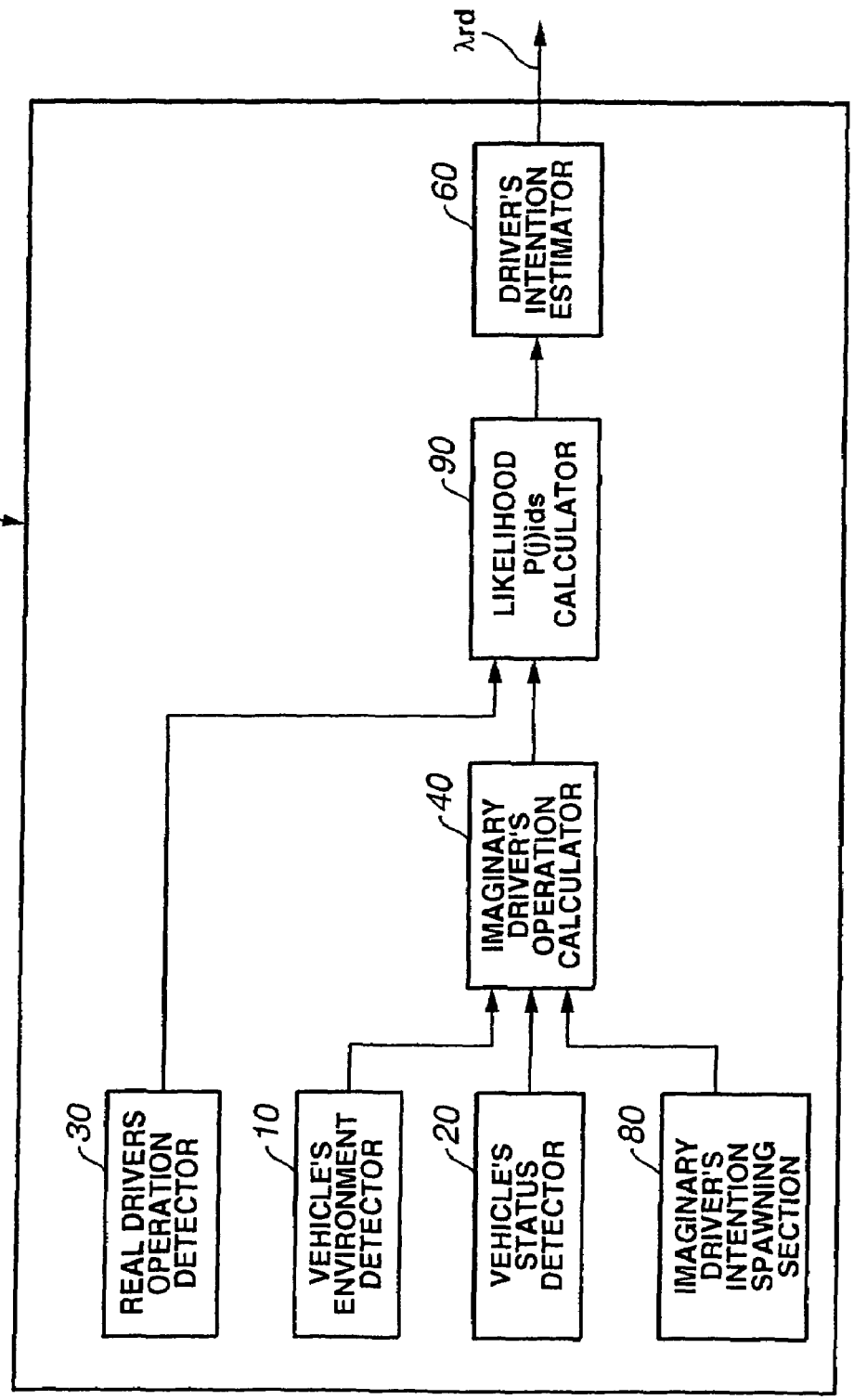
FIG. 7 is a block diagram illustrating another exemplary implementation of a driver's intention estimating system according to the present disclosure.

Referring to FIGS. 7 to 11, another exemplary implementation of the present disclosure is described. In FIG. 7, the reference numeral 3 designates a driver's intention estimating system. This system 3 is substantially the same as system 2 illustrated previously in FIG. 4. Like reference numerals are used to designate like elements throughout FIGS. 4 and 7. However, the system 3 is different from the system 2 in that, instead of using the less dynamic family of imaginary drivers A, B and C for calculating a collective likelihood value Pids for each imaginary driver, a dynamic family of imaginary drivers are used for calculating a collective likelihood value P(j)ids, where j is any integer, for each imaginary driver, to increase the accuracy in estimating a real driver's intention λrd.

With continuing reference to FIG. 7, the driver's intention estimating system 3 is different from the system 2 in that a functional block 80 labeled "imaginary driver's intention generating section" is newly provided for supporting the dynamic family of imaginary drivers. The imaginary driver's intention generating section 80 may be implemented by using one or more microcomputers and/or software, microcode and/or instructions. Further, the system 3 is different from the system 2 in that a functional block 90 labeled "likelihood value P(j)ids calculator" is provided instead of the likelihood value Pids calculator 70. The likelihood value P(j)ids calculator 90 may be implemented using one or more microcomputers and/or software, microcode and/or instructions. Similarly to an imaginary driver's operation calculator 40 and a driver's intention estimator 60, the likelihood value P(j)ids calculator 90 and the imaginary driver's intention generating section 80 may be implemented using software to be executed by a central processor unit (CPU).

In this exemplary implementation, the imaginary driver's intention generating section 80 utilizes data related to at least one imaginary driver having a lane-keeping intention (LK) at every point in time, generates data related to at least one additional imaginary driver. In one embodiment, the imaginary driver's intention generating section 80 generates data related to two additional imaginary drivers, each has one of two derivative lane-change intentions (LCR) and (LCL) based on a lane-keeping intention (LK) at an immediately preceding point in time. In another embodiment, the imaginary driver's intention generating section 80 applies special rules in generating the predecessors and successors of lane-change intentions (LCR) and (LCL).

Figure 8:
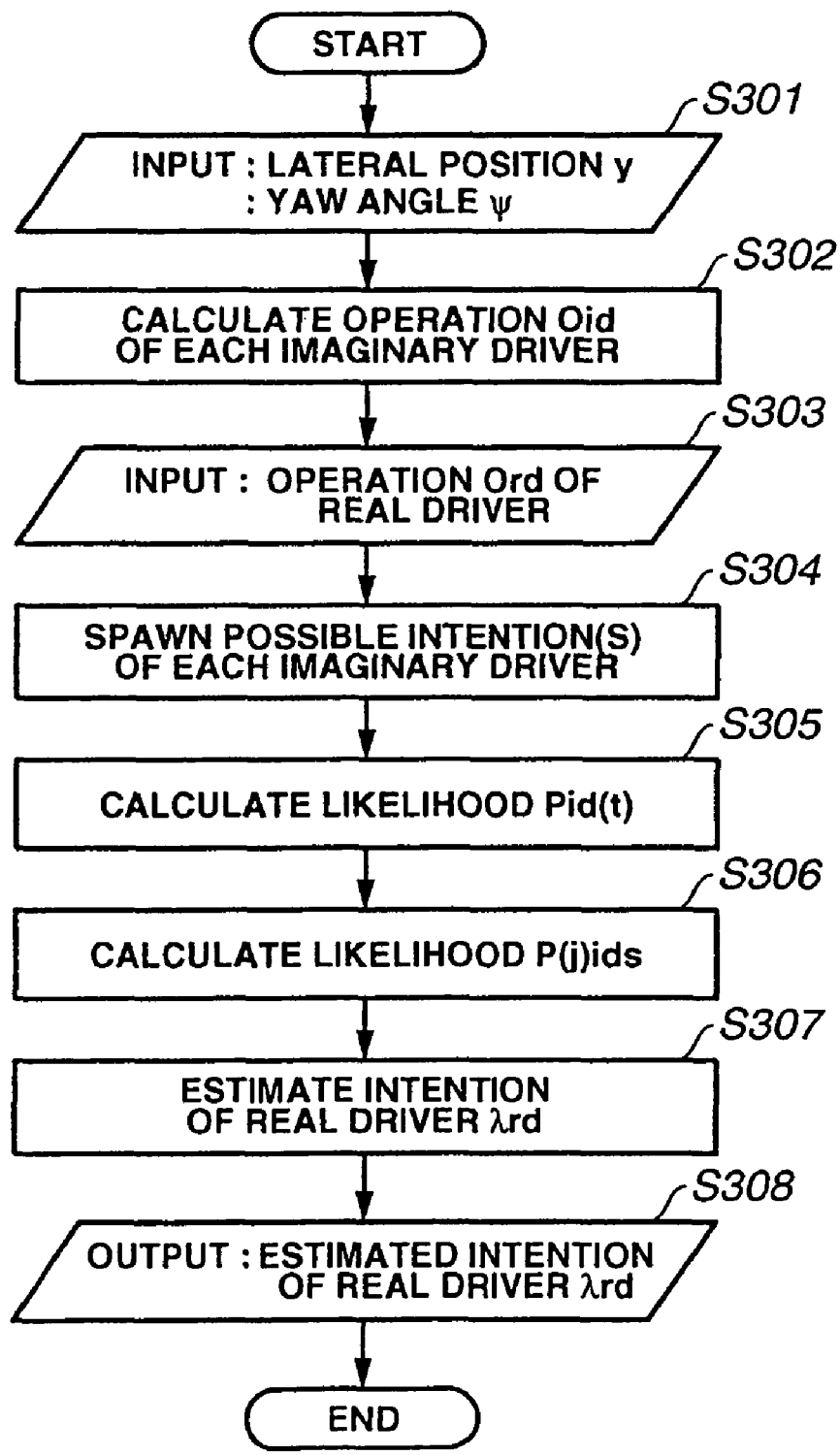
FIG. 8 is a flow chart illustrating the operation of the driver's intention estimating system illustrated in FIG. 7.

Referring to FIGS. 8 to 11, the operation of the driver's intention estimating system 3 is explained. The flow chart in FIG. 8 illustrates a driver's intention estimation processing program. Execution of this program is repeated at a regular interval of, for example, 50 milliseconds.

The flow chart illustrated in FIG. 8 has steps S301, S302 and S303, which correspond exactly to the steps S201, S202 and S203 of the flow chart illustrated in FIG. 4, which in turn corresponds to the steps S101, S102 and S103 of the flow chart illustrated in FIG. 2. Thus, the microcomputer performs substantially the same tasks down to step S303. After step S303, the logic goes to step S304.

At step S304, the microcomputer allows a lane-keeping intention (LK) to exist at the present point in time, causes the lane-keeping intention (LK) to generating two derivative lane-change intentions to the right (LCR) and to the left (LCL) for existing at the immediately succeeding point in time, determines whether or not the derivative lane-change intentions (LCR) and (LCL) existing at immediately preceding point in time are allowed to exist at the present point in time, and resets or cancels all of the derivative lane-change intentions (LCR) and (LCL) existing at the immediately preceding point in time and their predecessors upon determination that the derivative lane-change intentions (LCR) and (LCL) are not allowed to exist at the present point in time.

Figure 9:
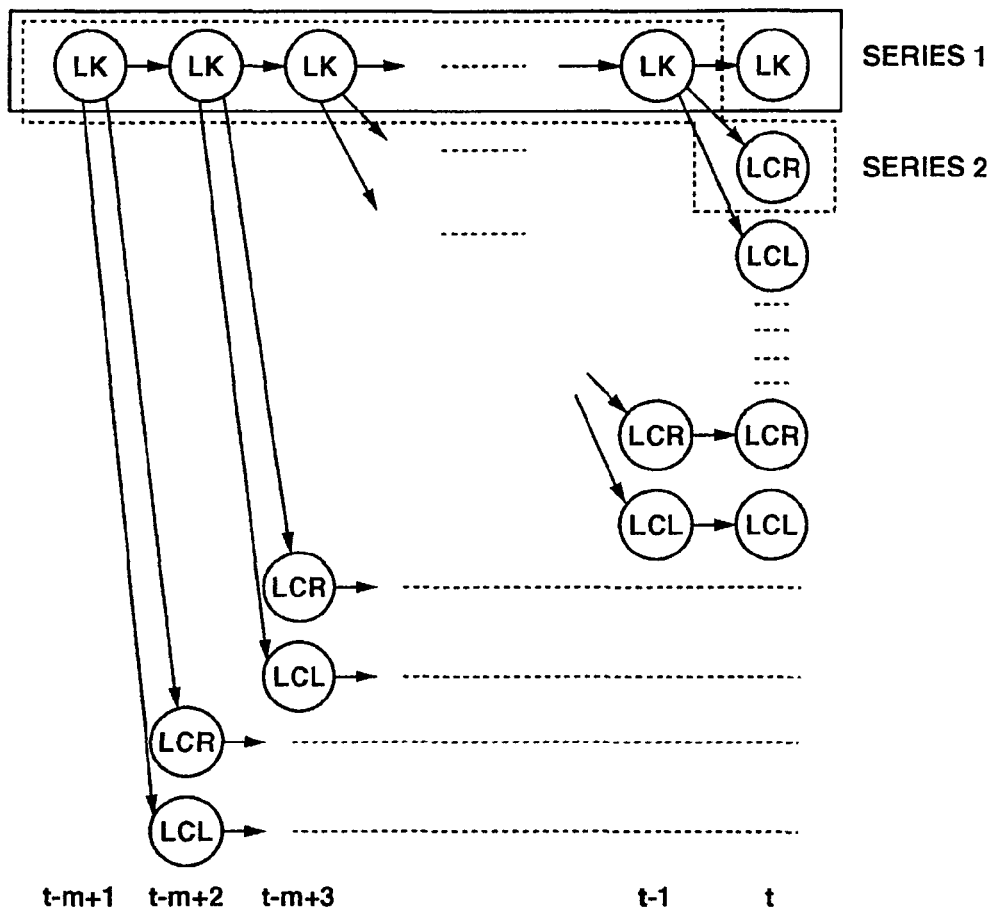
FIG. 9 is an exemplary illustration of generating a parent series of lane-keeping intentions and derivative lane-change intentions.

For better understanding of the process of generating data related to additional imaginary drivers, reference is made to FIG. 9. The microcomputer allows a parent imaginary driver (Series 1) to retain a lane-keeping intention (LK) at every point in time. Further, at every point in time with the parent imaginary driver having a lane-keeping intention (LK), the microcomputer generates data related to two additional imaginary drivers having lane-change intentions to the right (LCR) and to the left (LCL), respectively, for the next point in time. In one embodiment, an additional imaginary driver generated at a specific point of time assumes at least some of the intentions for all points of time preceding the specific point, from the parent imaginary driver.

Figure 10A:
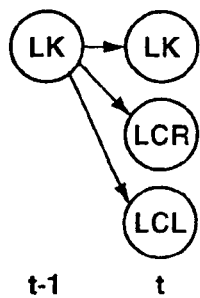
FIG. 10($a$) is an illustration of a first rule applied during generation of imaginary drivers as illustrated in FIG. 9.
Figure 10B:
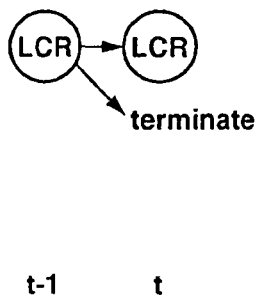

Furthermore, the microcomputer determines whether or not the vehicle's environment allows an imaginary driver to retain one of the derivative lane-change intentions at the next point in time. FIG. 10(a) illustrates a first rule for assigning intentions to imaginary drivers. The first rule allows the parent imaginary user to retain a lane-keeping intention (LK) at every point in time, and generates data related to two additional imaginary drivers having lane-change intentions (LCR) and (LCL), respectively, at the next point in time. FIG. 10(b) illustrates a second rule for assigning intentions to imaginary drivers. According to the second rule, an imaginary driver is allowed to retain a lane-change intention to the right (LCR) at the next point in time if it is determined that the real driver continues to retain a lane-changing intention at the present point in time. On the other hand, if it is determined that at a specific point in time, the real driver no longer wants to change lanes or has just changed lanes, an imaginary driver is not allowed to retain a lane-change intention to the right (LCR) at the next point in time. This second rule is equally applicable to a lane-change intention to the left (LCL). According to the second rule, an imaginary driver having a lane-change intention to the left (LCL) at a specific point in time is allowed to retain a lane-change intention to the left (LCL) at the next point in time upon determination that a lane change continues, but the imaginary driver is not allowed to continue to retain a lane-change intention to the left (LCL) at a specific point in time upon failure to determine that the lane change continues. Therefore, according to the second rule, an imaginary driver that has one of the derivative lane-change intentions (LCR) and (LCL), is allowed to retain the derivative lane-change intention at the next point in time upon determination that a lane change continues.

In the exemplary implementation, on one hand, the microcomputer determines that the lane-change intention continues if the vehicle continues to stay in the same lane. On the other hand, the microcomputer determines that the lane-change intention has been realized if the vehicle has changed to a different lane. In other words, the microcomputer fails to determine that the lane-change intention continues. Thus, an imaginary driver having one of the derivative lane-change intentions (LCR) and (LCL) at a specific point in time is allowed to retain the lane-change intention at the next point in time upon determination that the vehicle continues to stay in the same lane. On the other hand, an imaginary driver that has one of the derivative lane-change intentions (LCR) and (LCL) at a specific point in time is not allowed to retain the derivative lane-change intention at the next point in time upon determination that the vehicle has changed to a different lane. As will be understood from the descriptions below, an additional imaginary driver that has at least one derivative lane-change intention (LCR) or (LCL) at a specific point in time is terminated and reset at the next point in time upon determination that the vehicle has changed to a different lane.

In this exemplary implementation, the parent driver retains a parent series of lane-keeping intentions (LK), labeled "SERIES 1" in FIG. 9. The parent series of intentions consists of m (m is a natural number) lane-keeping intentions (LK) associated with a period of time ranging from the present point in time (t) back to the past point in time (t−m+1). The parent series of intentions will not be reset. Different from the parent series of intentions, the derivative series of intentions (such as Series 2) retained by additional imaginary drivers may be terminated and reset. Each of the derivative series of intentions consists of m (m is a natural number) intentions including a lane-change intention (LCR) or (LCL) and its predecessors. In the example shown in FIG. 9, as of time t, the number of additional imaginary drivers that retain derivative series of intentions amounts to 2(m−1)+1 and but will not exceed this number because any additional imaginary driver that retains a derivative series of intentions would not survive if the number of intentions it retains exceeds m. Upon determination that the vehicle has changed to a different lane at a specific point in time, all imaginary drivers existing before the specific point in time are terminated and reset at the specific point in time.

For example, assuming that the vehicle keeps on kicking a highway within the same lane, the total number of additional imaginary drivers remains unchanged, but they disappear one after another and are replaced by new ones. The parent imaginary driver, designed to behave as directed by the parent series of intentions, will not disappear. Next, assuming that the vehicle changes lanes, the number of additional imaginary drivers that behave as directed by the derivative series of intentions drops rapidly down to two (2) upon determination that the vehicle has changed lanes, and increases gradually to 2(m−1)+1 within a predetermined number of points in time. In this embodiment frame number m is 20 and the processing speed of the microcomputer is 0.1 second so the cycling time is 2 second.

Figure 11:
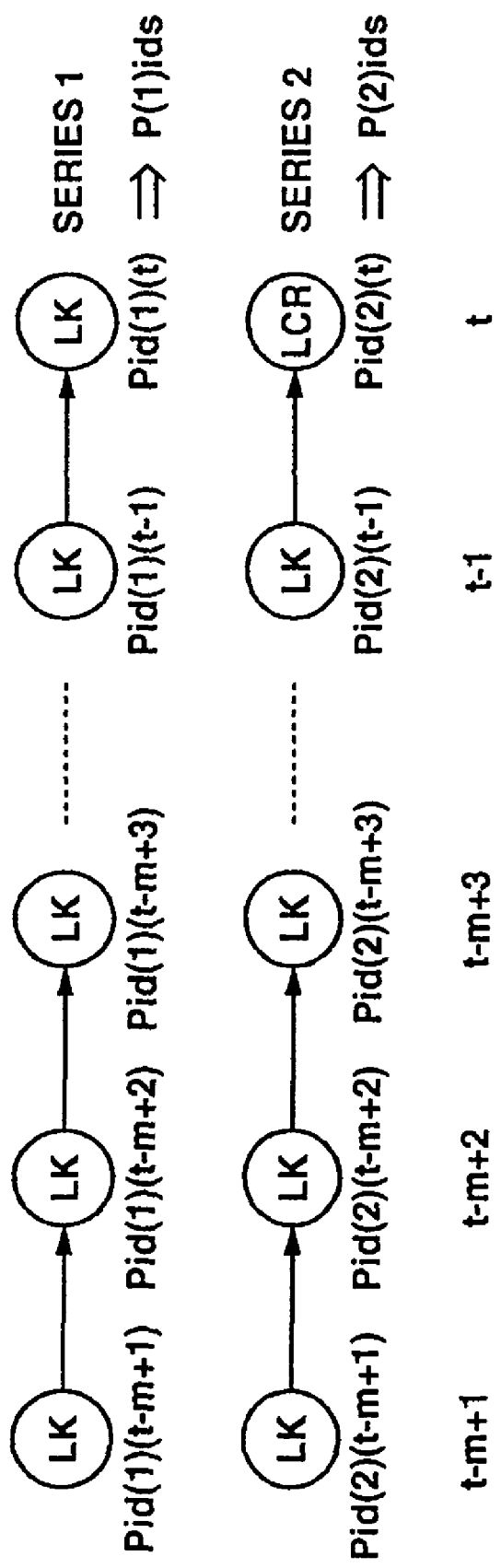
FIG. 11 is an exemplary illustration of first memory spaces that store current and past likelihood values for an parent imaginary driver that is designed to behave as directed by a plurality of intentions parents labeled "SERIES 1", parent and second memory spaces that store current and past likelihood values for another imaginary driver that is designed to behave as directed by a plurality of intentions labeled "SERIES 2."

At the next step S305, using the above-mentioned equation Eq. 7, the microcomputer calculates a likelihood value Pid(t) for each of the imaginary drivers of the dynamic family. The calculated likelihood values for the imaginary drivers are stored at different memory portions at locations labeled with numbers given to the parent series and the derivative series and expressed as Pid(j)(t), where j is a number (an integer) given to one of the parent and derivative series. Thus, Pid(j)(t) means a calculated likelihood value for an imaginary driver that is designed to behave as directed by an intention of a series j existing at a point in time t. The different memory locations are distinguishable one after another with the numbers given to the parent series and the existing derivative series. Each of the memory portions has m (m is a natural number) locations to store a series of m likelihood values calculated for one of the imaginary drivers at past and present points in time ranging from the present point in time indicated by (t) back to the past point in time indicated by (t−m+1). Taking the parent series labeled "SERIES 1" and one of the derivative series labeled "SERIES 2 illustrated in FIGS. 10 and 11 as an example, the calculated likelihood values for the parent imaginary driver are stored at locations indicated at Pid(1)(t), Pid(1)(t−1) ..., and Pid(1)(t−m+1), and the calculated likelihood values for the imaginary driver designed to behave as directed by the derivative series "SERIES 2" are stored at locations indicated at Pid(2)(t), Pid(2)(t−1) ..., and Pid(2)(t−m+1) as illustrated in FIG. 11.

At step S306, using the stored likelihood values Pid(j)~(t) Pid(j)(t−m+1), the microcomputer calculates a collective likelihood value P(j)ids for each imaginary driver that is designed to behave as directed by intentions of one series, which may be labeled "SERIES j", selected out of the parent and derivative series. The collective likelihood value P(j)ids may be expressed as:

$$P(j)ids = \prod_{i=1}^{m} Pid(j)(t-i+1)$$ (Eq. 11)

The equation Eq. 11 states that the likelihood value P(j)ids is the product of all of the calculated likelihood values stored at locations Pid(j)(t)~Pid(j)(t−m+1).

For example, in FIG. 11, a likelihood value P(1)ids for the parent imaginary driver designed to behave as directed by the lane-keeping intentions (LK) over the a period (t)~(t−m+1) of the parent series "SERIES 1" is given as the product of likelihood values Pid_lk(t)~Pid_lk(t−m+1). A likelihood value P(2)ids for the imaginary driver designed to behave as directed by the lane-change intention to the right (LCR) at the point in time (t) and the lane-keeping intentions (LK) over the time period (t−1)~(t−m+1) of the derivative series "SERIES 2" is given as the product of likelihood values Pid_lcr(t), Pid_lk(t−1)~Pid_lk(t−m+1).

At step S306, the microcomputer calculates the collective likelihood values P(j)ids for the parent imaginary driver designed to behave as directed by intentions of the parent series "SERIES 1" and all of the other imaginary drivers, each designed to behave as directed intentions of one of the existing derivative series. After calculating them, the logic goes to step S307.

At step S307, the microcomputer estimates an intention λrd of the real driver. In this exemplary implementation, the microcomputer chooses one of the imaginary driver's intentions having the maximum value among the calculated collective likelihood values P(j)ids as the intention λrd of the real driver. The real driver's intention λrd may be expressed as:

$$\lambda rd = \max\{P(j)ids\}$$ (Eq. 12)

At the next step S308, the microcomputer provides, as an output, the estimated real driver's intention λrd.

In addition to the effects provided by the exemplary implementations described before in connection with FIGS. 1 to 6, this exemplary implementation provides effects as follows:

(1) With reference to FIG. 7, the functional block 80 labeled "imaginary driver's intention generating section" supports the dynamic family of imaginary drivers by causing a lane-keeping intention (LK) existing at every point in time to generating two derivative lane-change intentions (LCR) and (LCL) at the next point in time as illustrated in FIG. 9. The function block 90 labeled "likelihood value P(j)ids calculator" calculates a likelihood value P(j)ids based on calculated present and past operations Oid of each imaginary driver designed to behave as directed by intentions of a series j, within a period of time ranging backwards from the present point in time (t), with respect to a series of the detected present and past operations Ord of the real driver within the same period of time. The functional block 60 labeled "driver's intention estimator" estimates an intention λrd of the real driver based on the likelihood value P(j)ids for each of the imaginary drivers. Using the likelihood value P(j)ids derived from the calculated present and past operations Oid of each of the imaginary drivers and the detected present and past operations Ord of the real driver within the same period of time provides increased accuracy in estimating the real driver's intention λrd.

(2) The functional block 90 determines a collective likelihood value P(j)ids for each of the imaginary drivers by calculating the product of all of present and past likelihood values Pid(j)(t) within the period of time ranging backwards from the present point in time (t). The collective likelihood value P(j)ids derived from the data collected within the period of time provides a more reliable tool in calculating a likelihood value of each of the imaginary driver with respect to the real driver.

(3) The functional block 80 determines whether or not derivative lane-change intentions (LCR) and (LCL) that existed at the immediately preceding point in time (t−1) are allowed to exist at the present point in time (t) based on the vehicle's environment determined at the present frame (t). Therefore, it is possible to select possible intentions only for forming a series j of imaginary driver's intentions, providing further increased accuracy in estimating the real driver's intention λrd.

In the preceding description, steering angles θrd and θid were used as operations Ord and Oid of the real and imaginary drivers. The present disclosure is not limited to this example. Another example is to use an accelerator pedal stroke instead of a steering angle. In this case, an accelerator pedal stroke Sid of an imaginary driver may be calculated based on a degree to which the vehicle has approached the preceding vehicle. This degree may be expressed by distance to the preceding vehicle and time headway THW. A likelihood value of the accelerator pedal stroke Sid with respect to an accelerator pedal stroke Srd of a real driver is calculated for use in estimating a real driver's intention.

In the preceding description, two reference points are provided for one of the intentions as shown in FIG. 3. Any desired number of reference points may be provided.

Fourth Exemplary Implementation

Figure 12:
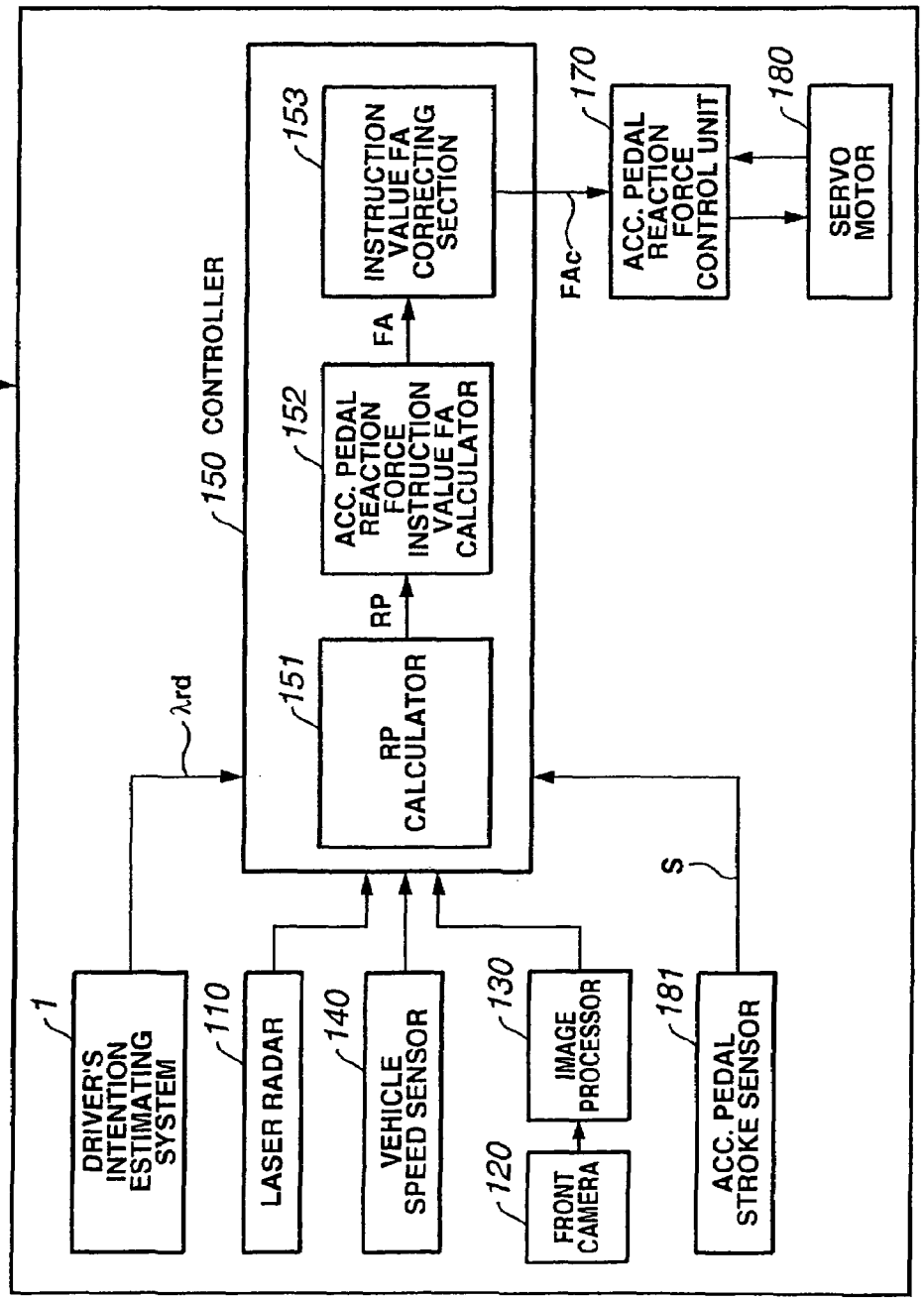
FIG. 12 is a block diagram illustrating another exemplary implementation of a driver assisting system according to the present disclosure.
Figure 13:
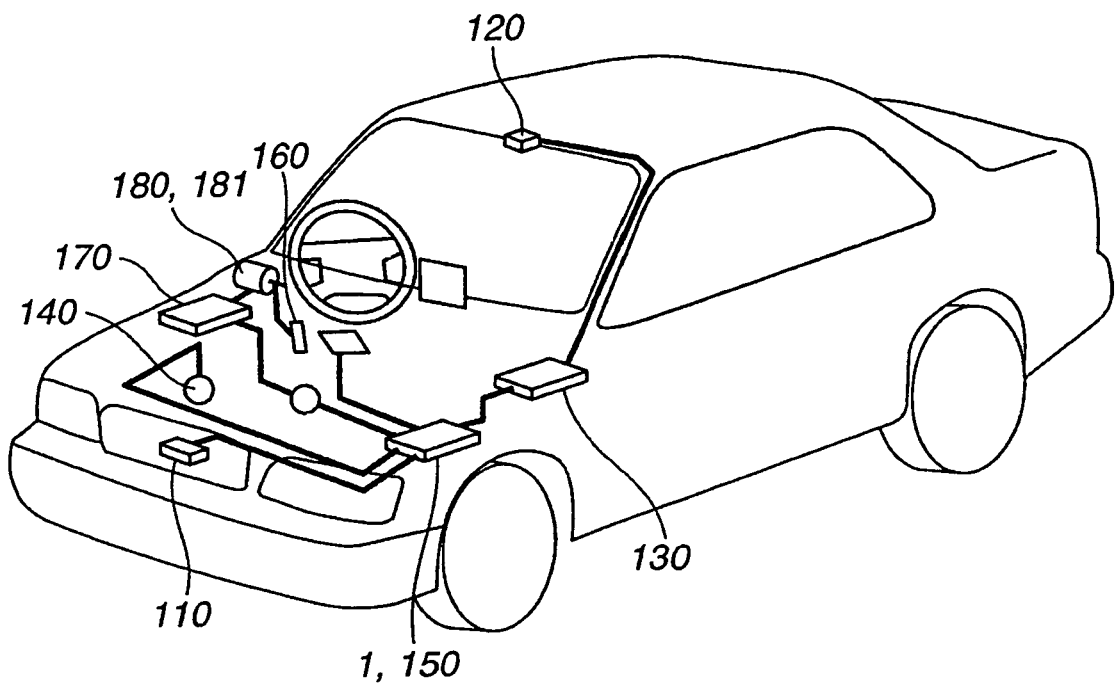
FIG. 13 is a perspective view of a vehicle in the form of an automobile incorporating a driver assisting system.

Referring to FIG. 12, an exemplary implementation of a driver assisting system 100 according to the present disclosure is described. As shown in FIG. 13, an exemplary automobile is installed with the driver assisting system 100.

For better understanding of the driver assisting system, reference should be made to US 2003/0060936 A1, published Mar. 27, 2003, which has been hereby incorporated by reference in its entirety.

Referring to FIGS. 12 and 13, the driver assisting system 100 includes a laser radar 110. As shown in FIG. 2, the laser radar 110 is mounted to the vehicle at a front bumper or a front grille thereof. It scans horizontally and laterally about 6 degrees to each side of an axis parallel to the vehicle longitudinal centerline, propagates infrared pulses forwardly and receives the reflected radiation by an obstacle, such as, a rear bumper of a preceding vehicle. The laser radar 110 can provide a distance d to a preceding vehicle in front and a relative speed Vr to the preceding vehicle. The laser radar 110 provides, as outputs, the detected distance d and relative speed Vr to a controller 150. The driver assisting system 100 also includes a front camera 120. The front camera 120 is of the CCD type or CMOS type and mounted to the vehicle in FIG. 13 in the vicinity of the internal rear view mirror to acquire image data of a region in front of the vehicle. The front camera 120 provides, as output signals, the acquired image data to an image processor 130. The image processor 130 provides the processed image data to the controller 150. The region covered by the front camera 120 extends from the camera axis to each side by 30 degrees.

The driver assisting system 100 also includes a vehicle speed sensor 140. The vehicle speed sensor 140 may determine a vehicle speed of the host vehicle by processing outputs from wheel speed sensors. The vehicle speed sensor 140 may include an engine controller or a transmission controller, which can provide a signal indicative of the vehicle speed. The vehicle speed sensor 140 provides, as an output, the vehicle speed of the host vehicle to the controller 150.

The driver assisting system 100 also includes a driver's intention estimating system. The driver's intention estimating system 1 or 2 or 3, which are illustrated in FIGS. 1 to 11, may be used in the driver assisting system 100 to provide, as an output, an estimated real driver's intention λrd to the controller 150.

The controller 150, which is responsible for information processing within the driver assisting system 100, may contain a microprocessor including a central processing unit (CPU), a read only memory (ROM), and a random access memory (RAM). The controller 150 includes, for example, software implementation of a risk potential (RP) calculator 151, a reaction force instruction value FA calculator 152 for applying a reaction force to a driver's control input device, such as an acceleration pedal or a steering wheel, and an instruction value FA correcting section 153.

The RP calculator 151 calculates a risk potential (RP) that may perceived by a real driver in connection with the vehicle's environment based on a vehicle speed V1 of the host vehicle, a distance D to the preceding vehicle, and a relative speed Vr to the preceding vehicle, which are given by processing output signals of the laser radar 110, vehicle speed sensor 140 and image processor 130. The RP calculator 151 provides, as an output, the risk potential RP to the accelerator pedal reaction force instruction value FA calculator 152.

The accelerator pedal reaction force instruction value FA calculator 152 calculates an accelerator pedal reaction force instruction value FA based on the risk potential RP. The accelerator pedal reaction force instruction value FA calculator 152 provides, as an output, the accelerator pedal reaction force instruction value FA to the instruction value FA correcting section 153.

The instruction value FA correcting section 153 corrects the accelerator pedal reaction force instruction value FA based on the estimated driver's intention λrd to give a corrected accelerator pedal reaction force instruction value FAc. The instruction value FA correcting section 153 provides, as an output, the corrected accelerator pedal reaction force instruction value FAc to an accelerator pedal reaction force control unit 170.

Figure 14:
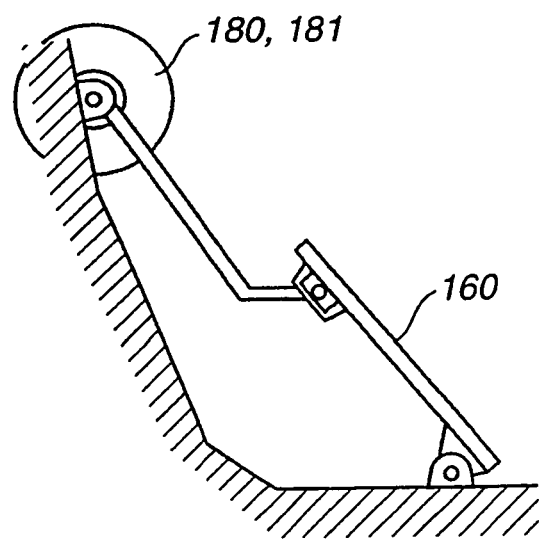
FIG. 14 depicts a driver controlled device, in the form of an accelerator pedal.

In response to the corrected accelerator pedal reaction force instruction value FAc, the accelerator pedal reaction force control unit 170 regulates a servo motor 180 of an accelerator pedal 160. As shown in FIG. 14, the accelerator pedal 160 has a link mechanism including a servo motor 180 and an accelerator pedal stroke sensor 181. The servo motor 180 may provide any desired torque and any desired angular position in response to an instruction from the accelerator pedal reaction force control unit 170. The accelerator pedal stroke sensor 181 detects an accelerator pedal stroke or position S of the accelerator pedal 160 by measuring an angle of the servo motor 180. The angle of the servo motor 180 corresponds to the accelerator pedal stroke S because the servo motor 180 and the accelerator pedal 160 are interconnected by the link mechanism.

For better understanding of the accelerator pedal of the above kind, reference should be made to US 2003/0236608 A1 (published Dec. 25, 2003) and also to US 2003/0233902 A1 (published Dec. 25, 2003), both of which have been incorporated herein by reference in their entireties.

When the accelerator pedal reaction force control unit 170 is not altering the reaction force, the reaction force increases linearly as the accelerator pedal stroke S increases. This ordinary reaction force varying characteristic is accomplished by a spring force provided by a torque spring arranged at the center of rotational movement of the accelerator pedal 160.

Figure 15:
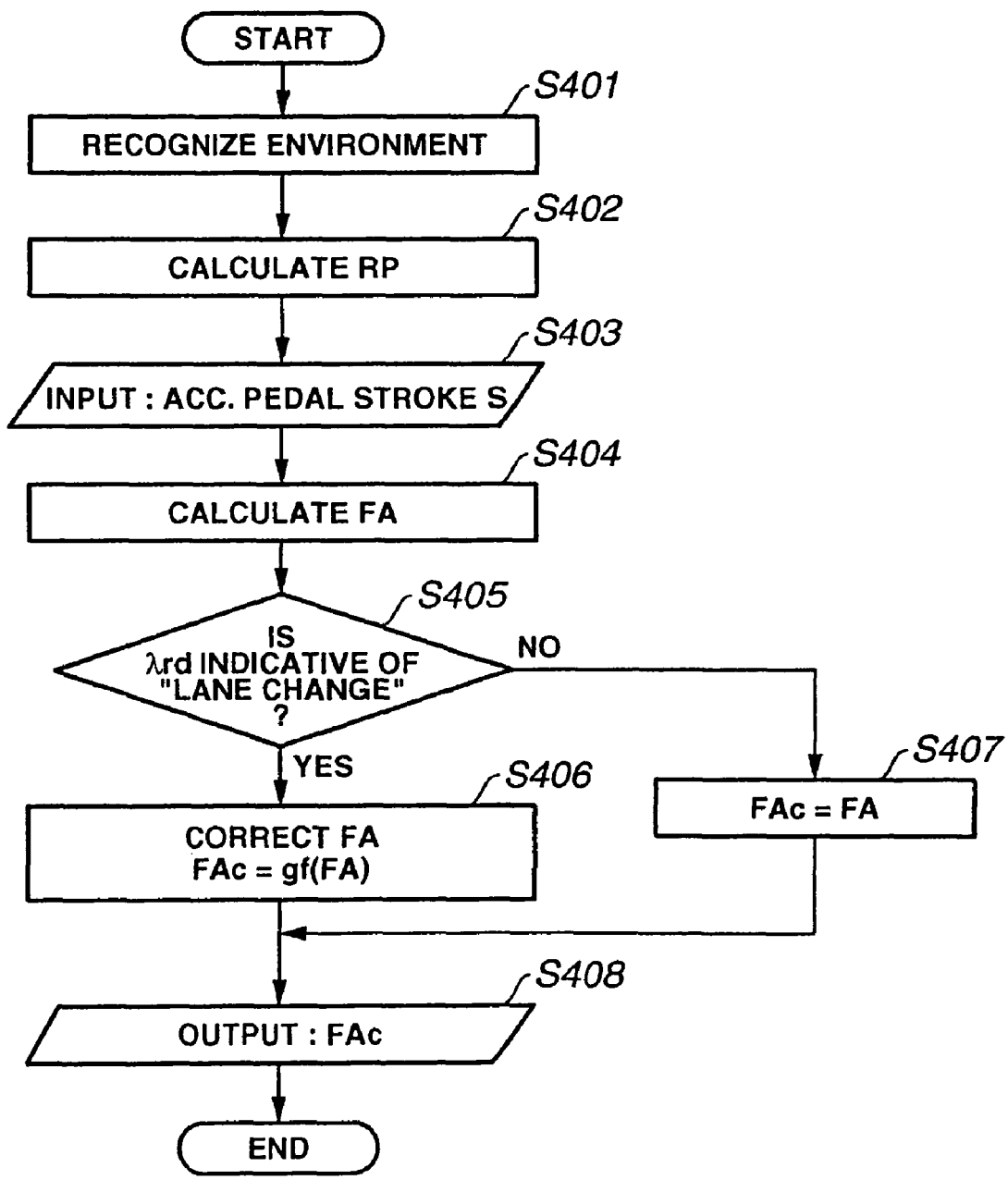
FIG. 15 is a flow chart illustrating the operation of the driver assisting system illustrated in FIG. 12.

Next, the following description along FIG. 15 provides more understanding of how the driver assisting system 100 works. The flow chart in FIG. 15 illustrates a control routine of a driver assisting control program stored in the controller 150. The execution of the control routine is repeated at a regular interval of, for example, 50 msec.

In FIG. 15, at step S401, the controller 150 recognize environment in a field around the host vehicle. In particular, the controller 150 receives, as inputs, signals of the laser radar 110, front camera 120 and vehicle speed sensor 140 by reading operations to acquire data regarding the vehicle's status and the vehicle's environment. Imaging a traffic scene where the host vehicle is following the preceding vehicle, for example, the acquired data include a vehicle speed V1 of the host vehicle, a vehicle speed V2 of the preceding vehicle, and a relative speed to the preceding vehicle Vr. The relative speed Vr may be expressed as Vr=V2−V1. The acquired data may include a coordinate X1 of the host vehicle and a coordinate X2 of the preceding vehicle, and a distance D to the preceding vehicle. The distance D may be expressed as D=X2−X1.

At step S402, the controller 150 calculates a risk potential RP by the driver from the preceding vehicle based on a time to collision TTC and a time headway THW, which are used as two notions to constitute the risk potential RP.

The TTC is a measure of time from a present or current moment to a future moment when the distance D would become zero if the relative speed Vr to the preceding vehicle remains unaltered. The TTC may be expressed as:

$$TTC = -D/Vr \quad \text{(Eq. 13)}$$

The smaller the value of TTC, the more imminent is the collision and the larger is the value of an extent the vehicle has approached the preceding vehicle. In the traffic scene where the host vehicle is following the preceding vehicle, most vehicle drivers perceived a high degree of risk and initiated deceleration to avoid collision well before the TTC becomes less than 4 seconds. To some extent, the TTC is a good indication for predicting a future behavior the vehicle driver might take. However, when it comes to quantifying the degree of risk, which the vehicle driver actually perceives, there is discrepancy between the TTC and the degree of risk. Thus, the TTC alone is insufficient to quantify the degree of risk.

Such discrepancy may be confirmed by considering a traffic scene where the relative speed Vr is zero. In this case, the TTC is infinite irrespective of how narrow the distance D is. However, the driver perceives an increase in the degree of risk in response to a reduction in the distance D, accounting for an increase in influence on the TTC by an unpredictable drop in a vehicle speed of the preceding vehicle.

To remedy the above-mentioned discrepancy, the notion of time headway THW has been introduced to quantify an increase how in influence on the TTC by an unpredictable drop in the vehicle speed of the preceding vehicle. The THW is a measure of a timer that is set to count up when the preceding vehicle reaches a point on a road and will be reset subsequently when the following vehicle will reach the same point. The THW is expressed as, $$THW = D/V1 \quad \text{(Eq. 14)}$$

In the case where the host vehicle is following the preceding vehicle, the vehicle speed V2 of the preceding vehicle may be used instead of the vehicle speed V1 in the above-mentioned equation Eq. 14.

The relationship between the two notions TTC and THW is such that a change in vehicle speed V2, if any, of the preceding vehicle results in a small change in the TTC when the THW is long, but the same change in vehicle speed V2 of the preceding vehicle results in a large change in the TTC when the THW is short.

In this exemplary implementation, the risk potential RP calculated at step S402 is expressed as a sum of a first extent and a second extent. The first extent represents to what degree the vehicle has approached the preceding vehicle. The second extent represents to what degree an unpredictable change in vehicle speed V2 of the preceding vehicle might have influence upon the vehicle. The first extent may be expressed as a function of the reciprocal of time to collision TTC, and the second extent may be expressed as a function of the reciprocal of time headway THW. The risk potential RP may be expressed as:

$$RP = a/THW + b/TTC \quad \text{(Eq. 15)}$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle is following the preceding vehicle. In this exemplary implementation, b=8 and a=1.

At step S403, the controller 150 receives, as an input, an accelerator pedal stroke S by reading operation of the output of the accelerator pedal stroke sensor 181.

At step S404, the controller 150 calculates an accelerator pedal reaction force instruction value FA. First, the controller 150 calculates a reaction force increment ΔF in response to the risk potential RP by, for example, referring to the characteristic curve shown in FIG. 16.

Figure 16:
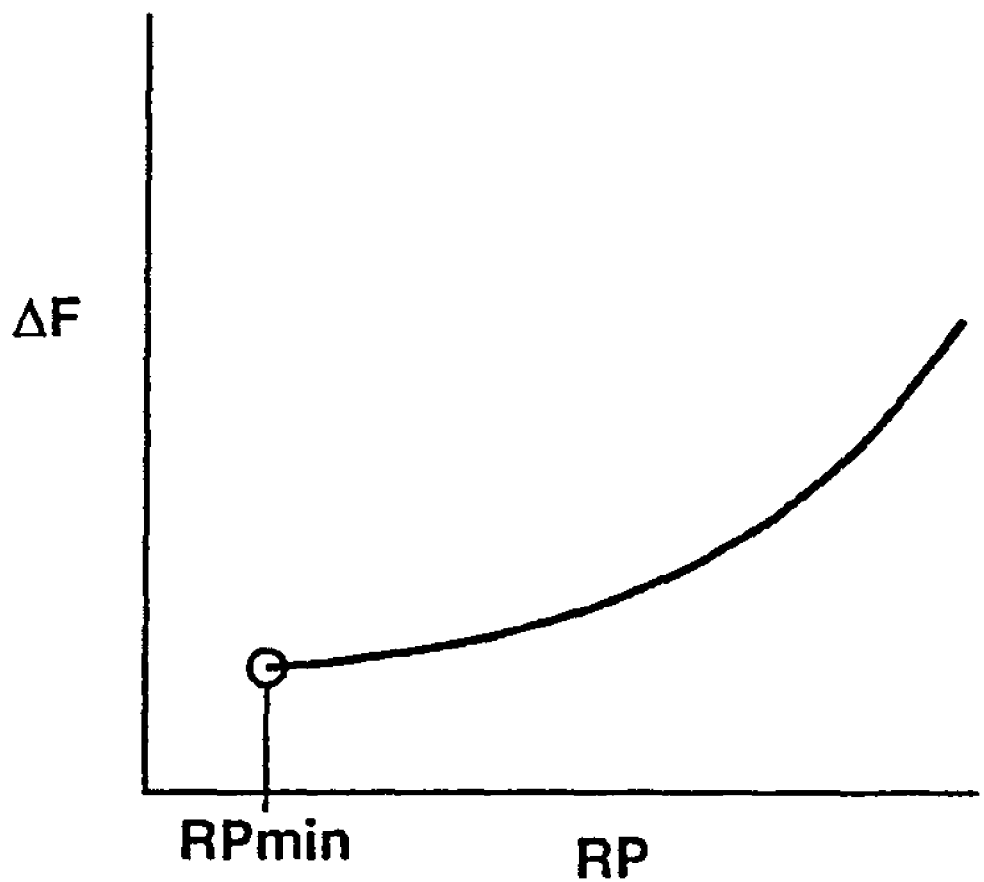
FIG. 16 shows a varying characteristic of a reaction force increment with different values of risk potential (RP).

The curve in FIG. 16 shows varying reaction force increment ΔF relative to different values of risk potential RP. When the risk potential RP is smaller than a minimum value RPmin, the reaction force increment ΔF is always zero in order to prevent unnecessary information from being presented to the driver. An appropriate value is predetermined as the minimum value RPmin.

Within a region where the risk potential RP exceeds the minimum value RPmin, the reaction force increment ΔF increases exponentially as the risk potential RP increases. The reaction force increment ΔF within this region may be expressed as:

$$\Delta F = k \cdot RP^n \quad \text{(Eq. 16)}$$

where: k and n are constants that are appropriately determined based on results obtained by drive simulator and field drive to provide smooth conversion of the risk potential RP to the reaction force increment ΔF.

The controller 150 calculates the sum of the reaction force increment ΔF and the ordinary reaction force characteristic to provide the accelerator pedal reaction force instruction value FA.

At step S405, the controller 150 determines whether or not the estimated driver's intention λrd is indicative of a lane-change intention. If this is the case, the logic goes to step S406.

At step S406, the controller 150 corrects the accelerator pedal reaction force instruction value FA to give a corrected accelerator pedal reaction force instruction value FAc. In this exemplary implementation, the accelerator pedal reaction force instruction value FA is processed by a low-pass filter and decreased. In this case, the corrected accelerator pedal reaction force instruction value FAc may be expressed as:

$$FAc = gf(FA) = kf \cdot 1/(1 + Tsf) \cdot FA \quad \text{(Eq. 17)}$$

where: kf is an appropriately determined constant, and Tsf is a time constant of the low-pass filter.

If, at step S405, the controller 150 determines that the estimated driver's intention λrd is indicative of a lane-keeping intention, the logic goes to S407.

At step S407, the controller 150 sets the accelerator pedal reaction force instruction value FA as the corrected accelerator pedal reaction force instruction value FAc.

At the next step S408, the controller 150 provides, as an output, the corrected accelerator pedal reaction force instruction value FAc that has been determined at step S406 or S407 to the accelerator pedal reaction force control unit 170.

The accelerator pedal reaction force control unit 170 controls the servo motor 180 in response to the corrected accelerator pedal reaction force instruction value FAc.

Figures 17A, 17B:
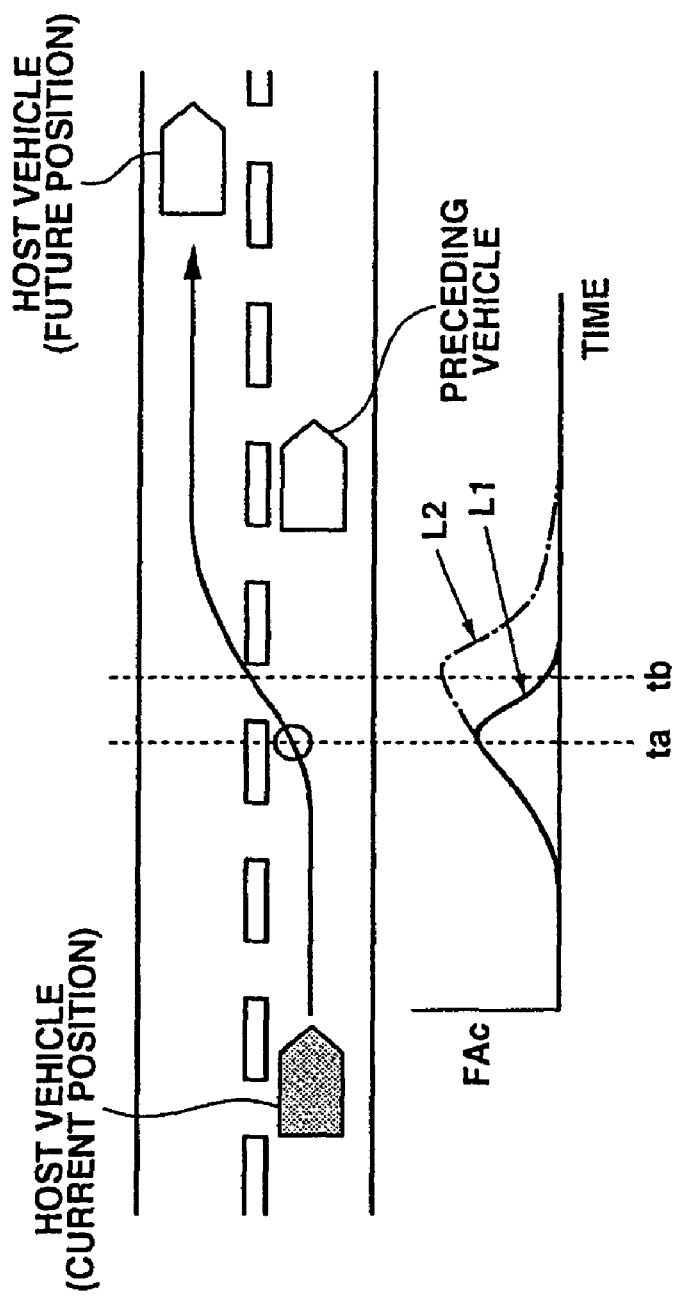
FIG. 17($a$) illustrates a traffic scene in which a vehicle changes lanes to pass the preceding vehicle.

Referring to FIGS. 17(a) and 17(b), the driver assisting system 100 is further described. FIG. 17(a) illustrates a traffic scene in which the host vehicle changes lanes to pass the preceding vehicle. FIG. 17(b) illustrates two curves: L1 (in solid line) and L2 (in dotted line). L2 is a curve showing that the reaction force of the accelerator pedal changing with the value of the risk potential, without considering the real driver's intention. As can be seen from L2, the reaction force steadily increases in response to an increased risk potential before the driver actually changes lanes at time tb. The increased reaction force tends to interfere with the driver's operation, even if a boost of engine output is eagerly needed by the driver in order to pass the preceding vehicle.

L1 shows curve with modifying reaction force based on an estimated driver's intention. As shown in curve L1, the accelerator pedal reaction force instruction value FAc is modified in response to the estimated driver's lane-change intention. At time ta, upon determination that the estimated driver's intention λrd is a lane-change intention, the corrected accelerator pedal reaction force instruction value FAc controls the reaction force to drop dramatically to allow a smoother manipulation of the accelerator pedal 160 by the real driver, for the lane-change purpose and the subsequent passing of the preceding vehicle.

As the accelerator pedal reaction force drops immediately before the driver behaves as directed by the lane-change intention, the driver's manipulation of the accelerator pedal 160 to change a lane will not be hampered.

This exemplary implementation has effects as follows:

(1) The controller 150 calculates the risk potential RP by the driver from the recognized environment around the host vehicle, and regulates accelerator pedal reaction force based on the calculated risk potential RP. The controller 150 corrects the reaction force at the accelerator pedal 160 based on the estimated driver's intention λrd, making it possible to reflect the driver's intention in regulating the accelerator pedal reaction force while keeping on forwarding the risk potential RP to the driver by applying the reaction force to the driver via the accelerator pedal 160.

(2) The controller 150 is provided with the accelerator pedal reaction force instruction value FA correcting section 153 that corrects the relationship between the risk potential RP and the reaction force. The accelerator pedal reaction force instruction value FA correcting section 153 causes a drop in accelerator pedal reaction force when the estimated driver's intention λrd is indicative of a lane-change intention than it does when the estimated driver's intention λrd is indicative of a lane-keeping intention. This makes it possible to provide a smooth driving experience in operating the accelerator pedal for changing lanes.

Fifth Exemplary Implementation

Figure 18:
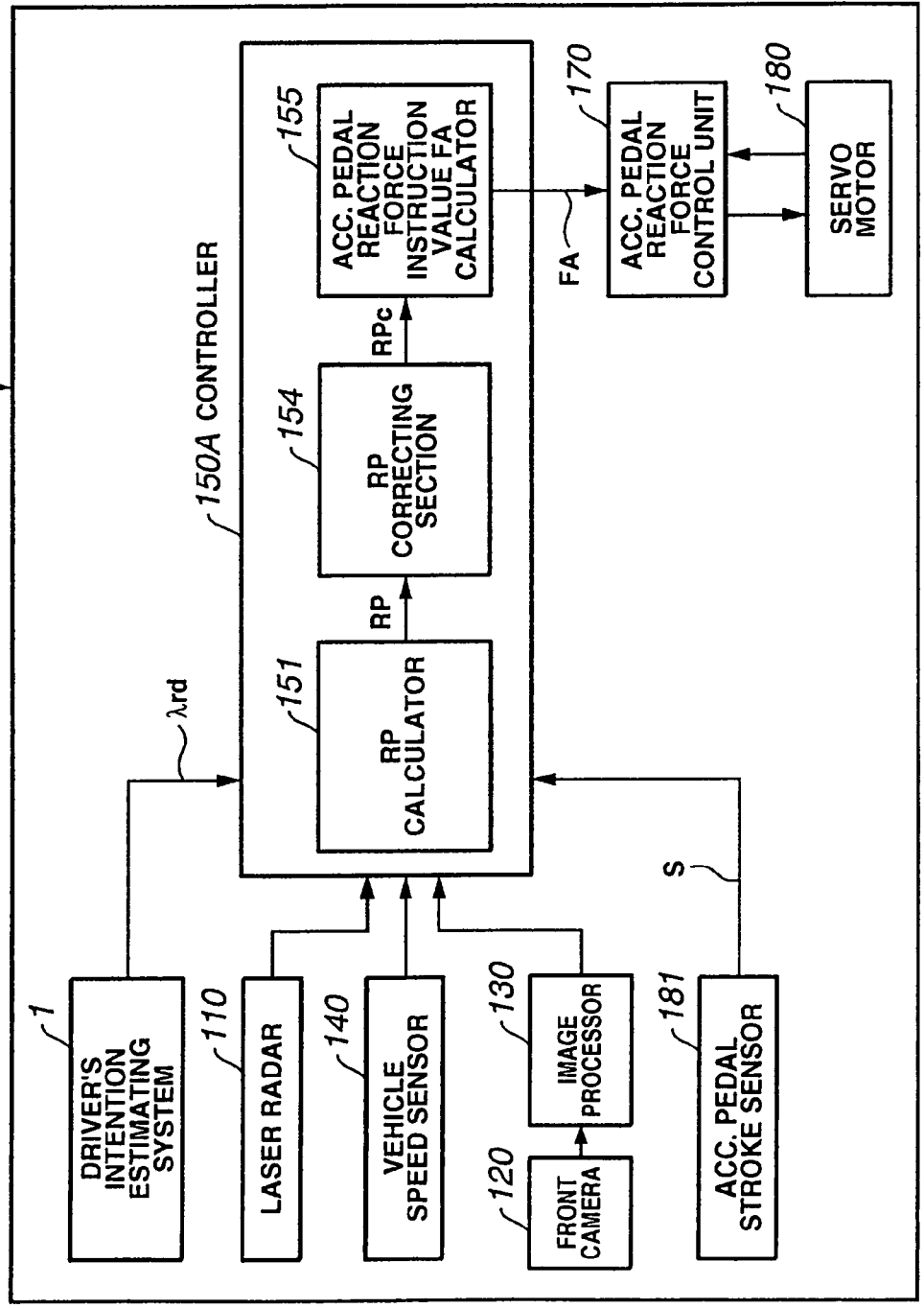
FIG. 18 is a block diagram illustrating another exemplary embodiment of a driver assisting system according to the present disclosure.

Referring to FIG. 18, another exemplary implementation of a driver assisting system 200 according to the present disclosure is described. The driver assisting system 200 is substantially the same as the driver assisting system 100. Thus, like reference numerals are used to designate like parts or portions throughout FIGS. 12 and 18. However, the driver assisting system 200 is different from the driver assisting system 100 in the following respects:

Different from the driver assisting system 100, the driver assisting system 200 corrects a risk potential RP upon determination that the estimated driver's intention λrd is indicative of a lane-change intention. The driver assisting system 200 includes a controller 150A. The controller 150A is provided with a software implementation of a risk potential (RP) calculator 151, a risk potential (RP) correcting section 154, and an accelerator pedal reaction force instruction value FA calculator 155.

Figure 19:
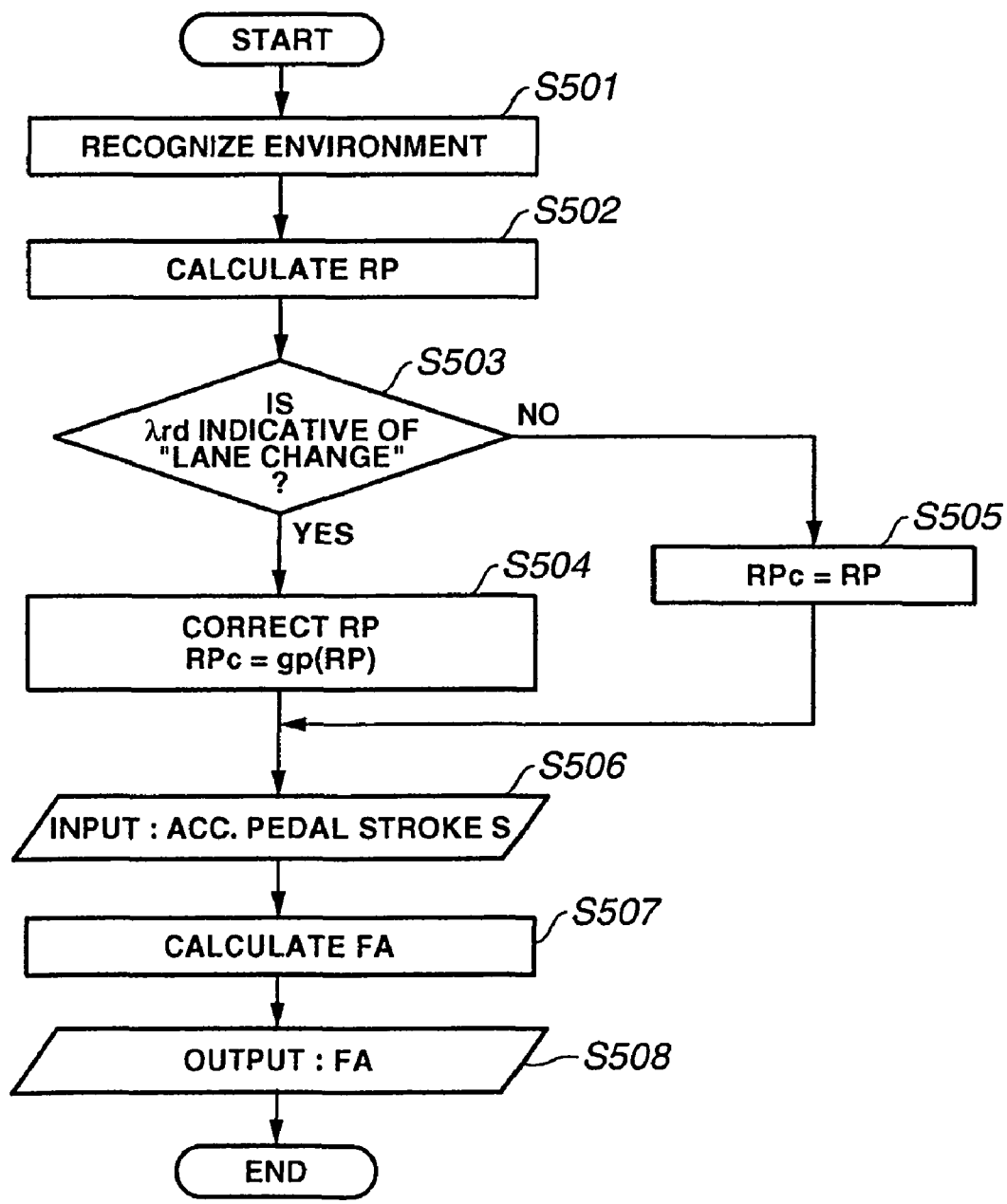
FIG. 19 is a flow chart illustrating the operation of the driver assisting system illustrated in FIG. 18.

The flow chart in FIG. 19 illustrates a control routine of a driver assisting control program stored in the controller 150A. The execution of the control routine is repeated at a regular interval of, for example, 50 msec. The flow chart illustrated in FIG. 19 has steps S501 and 502, which correspond to the steps S401 and S402 of the flow chart illustrated in FIG. 15. Thus, the controller 150A performs substantially the same jobs down to step S502.

At step S503, the controller 150A determines whether or not the estimated driver's intention λrd is indicative of a lane-change intention. If this is the case, the logic goes to step S504.

At step S504, the controller 150A corrects the risk potential RP to give a corrected risk potential RPc. In this exemplary implementation, the risk potential RP is processed by a low-pass filter and decreased. In this case, the corrected risk potential RPc may be expressed as:

$$RPc = gp(RP) = kp \cdot 1/(1+Tsp) \cdot RP \qquad \text{(Eq. 18)}$$

where: kp is an appropriately determined constant, and Tsp is a time constant of the low-pass filter.

If, at step S503, the controller 150A determines that the estimated driver's intention λrd is indicative of a lane-keeping intention, the logic goes to S505.

At step S505, the controller 150A sets the risk potential RP as the corrected risk potential RPc.

At the next step S506, the controller 150A receives, as an input, an accelerator pedal stroke S by reading operation of the output of the accelerator pedal stroke sensor 181.

At step S507, the controller 150A calculates an accelerator pedal reaction force instruction value FA. First, the controller 150 calculates a reaction force increment ΔF in response to the corrected risk potential RPc by, for example, referring to the characteristic curve shown in FIG. 16. Then, the controller 150A calculates the sum of the reaction force increment ΔF and the ordinary reaction force characteristic to give an accelerator pedal reaction force instruction value FA.

At the next step S808, the controller 150A provides, as an output, the accelerator pedal reaction force instruction value FA to an accelerator pedal reaction force control unit 170.

The accelerator pedal reaction force control unit 170 controls a servo motor 180 in response to the accelerator pedal reaction force instruction value FA.

This exemplary implementation has an effect as follows:

The controller 150A is provided with the risk potential RP correcting section 154, which can correct or modify the relationship between the obstacle state, including the preceding vehicle, around the host vehicle and the risk potential RP. The risk potential RP correcting section 154 decreases the risk potential RP upon determination that the estimated driver's intention is indicative of a lane-change intention, making it possible to decrease the reaction force at an accelerator pedal 160 before the driver actually operates the vehicle as directed by the lane-change intention.

In FIG. 12 or 18, the driver's intention estimating system 1 is provided for estimating a real driver's intention λrd. As mentioned before, the driver's intention estimating system 2 or 3 is provided for use in correcting an accelerator pedal reaction force instruction value FA or correcting a risk potential RP in order to alter the accelerator pedal reaction force upon determination that the estimated driver's intention λrd is indicative of a lane-change intention.

In the driver assisting systems 100 and 200, the risk potential RP was determined by the reciprocal of TTC and the reciprocal of THW. If desired, a risk potential RP might be a function of the reciprocal of TTC only.

Although the disclosure has been shown and described with respect to the exemplary implementations, it is obvious that equivalent alterations and modifications will occur to those skilled in the art upon reading and understanding of the specification. The present disclosure includes all such equivalent alterations and modifications, and is limited only by the scope of the claims.

What is claimed is:

1. A method for operating a driver's intention estimation system for estimating a driver's intention, wherein the system includes a microprocessor which, upon execution of software, controls the system to perform functions prescribed by the software, the method comprising the steps of:
    detecting an operation of a real driver of a vehicle;
    calculating an operation of each of a plurality of imaginary drivers to accomplish a respective associated intention according to a real-time vehicle driving condition and a respective associated intention of each imaginary driver;
    calculating a respective likelihood value for each of the plurality of imaginary drivers based on the detected operation of the real driver and the operation of each of the plurality of imaginary drivers; and
    determining an estimated intention of the real driver based on the respective likelihood value of each of the plurality of imaginary drivers with the respective associated intention.

2. The method of claim 1, wherein the determining step comprises the steps of:
    selecting one of the plurality of imaginary drivers based on the respective likelihood values; and
    determining the estimated intention of the real driver as the intention of the selected one of the plurality of imaginary drivers.

3. The method of claim 1, wherein the operation of each of the plurality of imaginary drivers is a lane-keeping intention, a lane-changing intention to the right or a lane-changing intention to the left.

4. The method of claim 1, wherein:
    the detecting step detects an operation of the real driver at each one of different points in time;
    each respective likelihood value for each of the plurality of imaginary drivers is generated based on partial likelihood values of each of the plurality of imaginary drivers at the different points in time; and
    each of the partial likelihood values is respectively associated with an operation of one of the plurality of imaginary drivers at each one of the different points in time, and is generated based on the respective detected operation of the real driver at each one of the different points in time and the respective operation of one of the plurality of imaginary drivers at each one of the different points in time.

5. The method of claim 4, wherein each respective likelihood value for each of the plurality of imaginary drivers is a respective summation of partial likelihood values of each of the plurality of imaginary drivers at the different points in time.

6. The method of claim 4 further comprising the step of generating data related to at least one additional imaginary driver at a selected point in time, based on the intention of a first one of the plurality of imaginary drivers at a point of time preceding the selected point of time, wherein each of the at least one additional imaginary driver has an associated intention and operation at each respective one of the different points in time.

7. The method of claim 6, wherein the intention of each of the at least one additional imaginary driver at the selected point of time is different from the intention of the first one of the plurality of imaginary drivers at the selected point of time.

8. The method of claim 6, wherein each additional imaginary driver assumes the associated intention of the first one of the plurality of imaginary drivers at each point in time preceding the selected point in time.

9. The method of claim 6, wherein for each of the imaginary drivers, an intention corresponding to a new point in time is generated based on the respective intention of each of the imaginary drivers at a point in time preceding the new point in time.

10. The method of claim 6, wherein a selected one of the plurality of imaginary drivers is eliminated based on an intention of the selected one of the plurality of imaginary drivers at a specific point in time and an operation status of the vehicle.

11. A method for using a driver's intention estimation system for estimating an operator's intention, wherein the system includes a microprocessor which, upon execution of software, controls the system to perform functions prescribed by the software, the method comprising the steps of:
    detecting an operation performed by an operator;
    calculating an operation of each of a plurality of imaginary operators to accomplish a respective associated intention according to a real-time operating condition and a respective associated intention of each imaginary operator;
    calculating a respective likelihood value for each of the plurality of imaginary operators based on the detected operation performed by the operator and the operation of each of the plurality of imaginary operators; and
    determining an estimated intention of the operator based on the respective likelihood value of each of the plurality of imaginary operators with the respective associated intention.

12. A method for using a driver's intention estimation system for estimating an intention of a driver to operate a vehicle, wherein the system includes a microprocessor which, upon execution of software, controls the system to perform functions prescribed by the software, the method comprising:
    detecting an operation of a real driver that operates a vehicle;

calculating an operation of each of a plurality of imaginary drivers to accomplish a respective associated intention according to a real-time vehicle driving condition and the respective associated intention;

calculating a respective likelihood value for each of the plurality of imaginary drivers based on the calculated operation of the imaginary driver and the detected operation of the real driver;

selecting one of the plurality of imaginary drivers based on the calculated respective likelihood value of each of the plurality of imaginary drivers; and determining the respective associated intention of the selected one imaginary driver as an intention of the real driver.

13. The method of claim 12, wherein the respective likelihood value is the probability of occurrence population expressed by a normal distribution, and the mean is the detected operation of the real driver and the variance is a predetermined value.

* * * * *